United States Patent [19]
Andoh et al.

[11] Patent Number: 5,821,689
[45] Date of Patent: Oct. 13, 1998

[54] IMAGE-FORMING APPARATUS

[75] Inventors: Tomokazu Andoh; Yoshiyuki Osada, both of Atsugi; Toshihiko Miyazaki, Isehara; Hideaki Mitsutake, Yokohama; Naoto Nakamura, Isehara; Masahiro Tagawa, Isehara; Tadashi Kaneko, Isehara, all of Japan

[73] Assignee: Canon Kabushiki Kaisha, Tokyo, Japan

[21] Appl. No.: 813,971

[22] Filed: Feb. 28, 1997

Related U.S. Application Data

[63] Continuation of Ser. No. 245,088, May 17, 1994, abandoned.

[30] Foreign Application Priority Data

| May 20, 1993 | [JP] | Japan | 5-139926 |
| May 26, 1993 | [JP] | Japan | 5-145418 |
| May 10, 1994 | [JP] | Japan | 6-119705 |

[51] Int. Cl.[6] .............. H01J 1/62; H01J 63/04; H01J 1/88; H01J 19/42
[52] U.S. Cl. .............. 313/495; 313/243; 313/253; 313/292
[58] Field of Search .............. 313/493–95, 582, 313/584, 586, 587, 634, 238, 241, 243, 253, 257, 260, 261, 268, 292

[56] References Cited

U.S. PATENT DOCUMENTS

| 4,692,662 | 9/1987 | Wada | 313/493 |
| 5,066,883 | 11/1991 | Yoshioka et al. | 313/309 |
| 5,182,489 | 1/1993 | Sano | 313/485 |
| 5,302,881 | 4/1994 | O'Loughlin | 315/111.21 |
| 5,329,203 | 7/1994 | Jeong | 313/491 |
| 5,371,433 | 12/1994 | Horne | 313/495 |
| 5,386,175 | 1/1995 | Van Gorkom | 313/422 |

FOREIGN PATENT DOCUMENTS

| 0405262 | 1/1991 | European Pat. Off. . |
| 0493804 | 7/1992 | European Pat. Off. . |
| 0523702 | 1/1993 | European Pat. Off. . |
| 2-299137 | of 0000 | Japan . |
| 2-299140 | of 0000 | Japan . |
| 59-114734 | 7/1984 | Japan . |
| 64-31332 | 2/1989 | Japan . |
| 1257552 | 10/1989 | Japan . |
| 1283749 | 11/1989 | Japan . |
| 2299136 | 12/1990 | Japan . |
| 0219530 | 9/1991 | Japan . |

OTHER PUBLICATIONS

W.P. Dyke, et al, "Field Emission", Advances in Electornics and Electron Physics, vol. VIII, pp. 89–185 (1956).

C.A. Spindt, et al., "Physical Properties of Thin–Film Emission Cathodes with Molybdenum Cones", Journal of Applied Physics, Vol. 47, No. 12, pp. 5248–5263 (Dec. 1976).

(List continued on next page.)

Primary Examiner—Sandra L. O'Shea
Assistant Examiner—Mark Haynes
Attorney, Agent, or Firm—Fitzpatrick, Cella, Harper & Scinto

[57] ABSTRACT

An image-forming apparatus comprises a back plate carrying thereon a plurality of electron-emitting devices, a face plate arranged vis-a-vis the back plate and carrying thereon a fluorescent member and an anti-atmospheric-pressure spacer. The longitudinal axis of the anti-atmospheric-pressure spacer is arranged substantially in parallel with the direction of deflection of electron beams emitted from said electron-emitting devices.

15 Claims, 21 Drawing Sheets

OTHER PUBLICATIONS

C.A. Mead, "Operation of Tunnel–Emission Devices", Journal of Applied Physics, vol. 32, No. 4, pp. 646–652 (Apr. 1961).

M.I. Ellinson, et al., "The Emission of Hot Electrons and the Field Emission of Electrons from Tin Oxide", Radio Engineering and Electronic Physics, No. 7, pp. 1290–1296 (Jul. 1965).

G. Dittmer, "Electrical Conduction and Electron Emission of Discontinuous Thin Films", Thim Solid Films, No. 9, pp. 317–329 (1972).

M. Hartwell, et al., "Strong Electron Emission from Patterned Tin–Indium Oxide Thin Films", International Electron Devices Meeting, pp. 519–521 (1975).

H. Araki, et al., "Electroforming and Electon Emission of Carbon Thin Films", Journal of the Vacuum Society of Japan, vol. 26, No. 1, pp. 22–29 (Sep. 1981).

IMAGE-FORMING APPARATUS

This application is a continuation of application Ser. No. 08/245,088, filed May 17, 1994, now abandoned.

BACKGROUND OF THE INVENTION

1. Field of the Invention

This invention relates to an image-forming apparatus such as a display apparatus and, more particularly, it relates to an image-forming apparatus comprising a spacer arranged inside the apparatus.

2. Related Background Art

There have been known two types of electron-emitting devices; the thermoelectron type and the cold cathode type.

Of these, the cold cathode type can be the field emission type (hereinafter referred to as the FE-type), the metal/insulation layer/metal type (hereinafter referred to as the MIM-type) and the surface conduction type.

Examples of the FE electron-emitting device are described in W. P. Dyke & W. W. Dolan, "Field emission", Advance in Electron Physics, 8, 89 (1956) and C. A. Spindt, "PHYSICAL Properties of thin-film field emission cathodes with Molybdenum cones", J. Appl. Phys., 47, 5284 (1976). MIM devices are disclosed in papers including C. A. Mead, "The tunnel-emission amplifier", J. Appl. Phys., 32, 646 (1961). Surface conduction electron-emitting devices are proposed in papers including M. I. Elinson, Radio Eng. Electron Phys., 10 (1965).

A surface conduction electron-emitting device is realized by utilizing the phenomenon that electrons are emitted out of a small thin film formed on a substrate when an electric current is forced to flow in parallel with the film surface. While Elinson proposes the use of $SnO_2$ thin film for a device of this type, the use of Au thin film is proposed in G. Dittmer: "Thin Solid Films", 9, 317 (1972), whereas the use of $In_2O_3/SnO_2$ thin film and the use of carbon thin film are discussed respectively in M. Hartwell and C. G. Fonstad: "IEEE Trans. ED Conf.", 519 (1975) and H. Araki et al.: "Vacuum", Vol. 26, No. 1, p. 22 (1983).

FIG. 22 of the accompanying drawings schematically illustrates a typical surface conduction electron-emitting device proposed by M. Hartwell. In FIG. 22, reference numerals 1011 and 1013 respectively denote a substrate and an electrically conductive film, which is normally prepared by producing an H-shaped thin metal oxide film according to a given pattern by means of sputtering, part of which eventually makes an electron-emitting region 1012 when it is subjected to an electrically energizing process referred to as "electric forming". In FIG. 22, the thin horizontal area of the metal oxide film separating a pair of device electrodes has a length L of 0.5 to 1 mm and a width W' of 0.1 mm. Note that the electron-emitting region 1012 is only very schematically shown because there is no way to accurately know its contour and location.

As described above, the conductive film 1013 of such a surface conduction electron-emitting device is normally subjected to an electrically energizing preliminary process, which is referred to as "electric forming", to produce an electron-emitting region 1012. In the electric forming process, a DC voltage or a slowly rising voltage that rises typically at a rate of 1V/min. is applied to given opposite ends of the conductive film 1013 to partly destroy, deform or transform the thin film and produce an electron-emitting region 1012 which is electrically highly resistive. Thus, the electron-emitting region 1012 is a part of the conductive film 1013 that typically has fissures therein so that electrons may be emitted those fissures.

Note that, once subjected to an electric forming process, a surface conduction electron-emitting device comes to emit electrons from its electron-emitting region 1012 whenever an appropriate voltage is applied to the conductive film 1013 to make an electric current run through the device.

Since a surface conduction electron-emitting device as described above is structurally simple and can be manufactured in a simple manner, a large number of such devices can advantageously be arranged on a large area without difficulty. As a matter of fact, a number of studies have been made to fully exploit this advantage of surface conduction electron-emitting devices. Applications of devices of the type under consideration include charged electron beam sources and electronic displays.

In typical examples of applications involving a large number of surface conduction electron-emitting devices, the devices are arranged in parallel rows to show a ladder-like shape and each of the devices are respectively connected at given opposite ends with wires (common wires) that are arranged in columns to form an electron source (as disclosed in Japanese Patent Application Laid-open Nos. 64-31332, 1-283749 and 1-257552). As for display apparatuses and other image-forming apparatuses comprising surface conduction electron-emitting devices such as electronic displays, although flat-panel type displays comprising a liquid crystal panel in place of a CRT have gained popularity in recent years, such displays are not without problems. One of the problems is that a light source needs to be additionally incorporated into the display in order to illuminate the liquid crystal panel because the display is not of the so-called emission type and, therefore, there is a need for the development of emission type display apparatuses in the industry. An emission type electronic display that is free from this problem can be realized by using a light source prepared by arranging a large number of surface conduction electron-emitting devices in combination with fluorescent members that are made to shed visible light by electrons emitted from the electron source (see, for example, the U.S. Pat. No. 5,066,883 of the applicant of the present patent application).

An image-forming apparatus having a configuration as described above normally requires one or more than one spacers arranged within it in order to keep the inside to a given degree of vacuum to optimally operate the devices if the display screen has a large surface area that has to withstand the atmospheric pressure (see Japanese Patent Application Laid-open No. 299136). An image-forming apparatus of the above described type is illustrated in the accompanying drawings.

FIG. 20 shows a partial sectional view of an image-forming apparatus of the above described type. This apparatus is realized by using a cold cathode electron source comprising surface conduction electron-emitting devices. Referring to FIG. 20, a number of electron-emitting devices 2025 (each having a pair of electrodes 2022, 2023 and an electron-emitting region 2024 arranged therebetween) are formed on a substrate 2021 and a face plate 2030 disposed vis-a-vis the substrate 2021 comprises a plate glass 2027 and a fluorescent layer 2028 arranged on the inner surface of the glass plate 2027. When the image-forming apparatus is a color image-forming apparatus, the fluorescent layer 2028 is realized by alternately arranging a number of fluorescent members 2032 and black members 2031, which are also called black stripes, as shown in FIG. 21. The black stripes are used in order to make the border lines separating the red, green and blue fluorescent members that are indispensably used for a color display less remarkable and avoid any possible reduction in the contrast in the displayed picture that can be brought forth by external light reflected by the fluorescent layer 2028.

The fluorescent layer 2028 is normally provided on the inner surface with a lining which is called a metal back 2029.

The metal back 2029 is arranged in order to prevent any possible reduction in the potential of the apparatus that can be produced by an electric charge (electrons) that may be accumulated on the fluorescent layer 2032 having a relatively high specific resistance ranging between $10^{10}$ and $10^{12} \Omega cm$, utilize it as an electrode for applying a voltage to the electron beams generated within the apparatus and accelerating the electrons of the electron beams and, at the same time, improve the brightness of the display screen through mirror reflection of the rays of light emitted by the fluorescent members and directed toward the inside of the apparatus as well to protect the fluorescent members 2032 against damages that can be caused to them by ions. Normally, aluminum is used for the metal back 2029 as a material most suited for the above purposes.

A plurality of spacers 2026 are regularly arranged within the apparatus in order to keep the distance between the substrate 2021 carrying a number of electron-emitting devices 2025 and the face plate 2030 to a predetermined constant value against the atmospheric pressure.

SUMMARY OF THE INVENTION

It is an object of the present invention to provide an image-forming apparatus such as a display apparatus comprising, in particular, an anti-atmospheric-pressure spacer that effectively prevents any possible reduction in the rate of electron beam irradiation of the image-forming member (fluorescent target) that can be caused by collisions of electron beams emitted from the electron source of the apparatus and the anti-atmospheric-pressure spacer.

It is another object of the present invention to provide an image-forming apparatus that effectively prevents any charge-up phenomenon due to collisions of electron beams and the anti-atmospheric-pressure spacer, degradation in the quality of images formed on the display screen due to unpredictable deviations in the electron beam tracks of the apparatus and destruction of any of the electron-emitting devices due to creeping discharge in the apparatus from taking place, said degradation and destruction being attributable to the charge-up phenomenon.

It is still another object of the present invention to provide an image-forming apparatus comprising an anti-atmospheric-pressure spacer that is effectively arranged to improve the evacuation efficiency of the apparatus.

It is still another object of the present invention to provide an image-forming apparatus comprising an anti-atmospheric-pressure spacer that is free from damages that can be caused to the fluorescent layer and the electron-emitting devices of the apparatus by the anti-atmospheric-pressure spacer so that the apparatus may enjoy a prolonged service life, operating stably to produce highly clear images.

According to the invention, the above objects and other objects of the invention are achieved by providing an image-forming apparatus comprising a back plate carrying thereon a plurality of electron-emitting devices, a face plate arranged vis-a-vis the back plate and carrying thereon a fluorescent member and an anti-atmospheric-pressure spacer, characterized in that the longitudinal axis of the anti-atmospheric-pressure spacer is arranged substantially in parallel with the direction of deflection of-electron beams emitted from said electron-emitting devices.

According to the invention, there is also provided an image-forming apparatus comprising a back plate carrying thereon a plurality of electron-emitting devices, a face plate arranged vis-a-vis the back plate and carrying thereon a fluorescent member and an anti-atmospheric-pressure spacer, characterized in that a device-side rib is arranged on the back plate, projecting from the back plate higher than any of the electrodes of the electron-emitting devices, and a fluorescent-layer-side rib is arranged on the face plate, projecting from the face plate higher than the fluorescent layer, said anti-atmospheric-pressure spacer being held in contact with the back plate and the face plate respectively by way of the device-side rib and the fluorescent-layer-side rib.

According to the invention, there is also provided an image-forming apparatus comprising a back plate carrying thereon a plurality of electron-emitting devices, a face plate arranged vis-a-vis the back plate and carrying thereon a fluorescent member and an anti-atmospheric-pressure spacer, characterized in that the longitudinal axis of the anti-atmospheric-pressure spacer is arranged substantially in parallel with the direction of deflection of electron beams emitted from said electron-emitting devices and that a device-side rib is arranged on the back plate, projecting from the back plate higher than any of the electrodes of the electron-emitting devices, and a fluorescent-layer-side rib is arranged on the face plate, projecting from the face plate higher than the fluorescent layer, said anti-atmospheric-pressure spacer being held in contact with the back plate and the face plate respectively by way of the device-side rib and the fluorescent-layer-side rib.

DETAILED DESCRIPTION OF THE PREFERRED EMBODIMENTS

Now, the present invention will be described in greater detail by referring to the accompanying drawings that illustrate preferred embodiments of the invention.

As described in greater detail hereinafter, electron-emitting devices to be particularly suitably used for the purpose of the invention are surface conduction electron-emitting devices. This is because, as described earlier, a surface conduction electron-emitting device is structurally simple and can be manufactured in a simple manner and, therefore, a large number of such devices can advantageously be arranged on a large area without difficulty.

A surface conduction electron-emitting device characteristically operates for electron emission in a manner as described below.

Figure 23A:
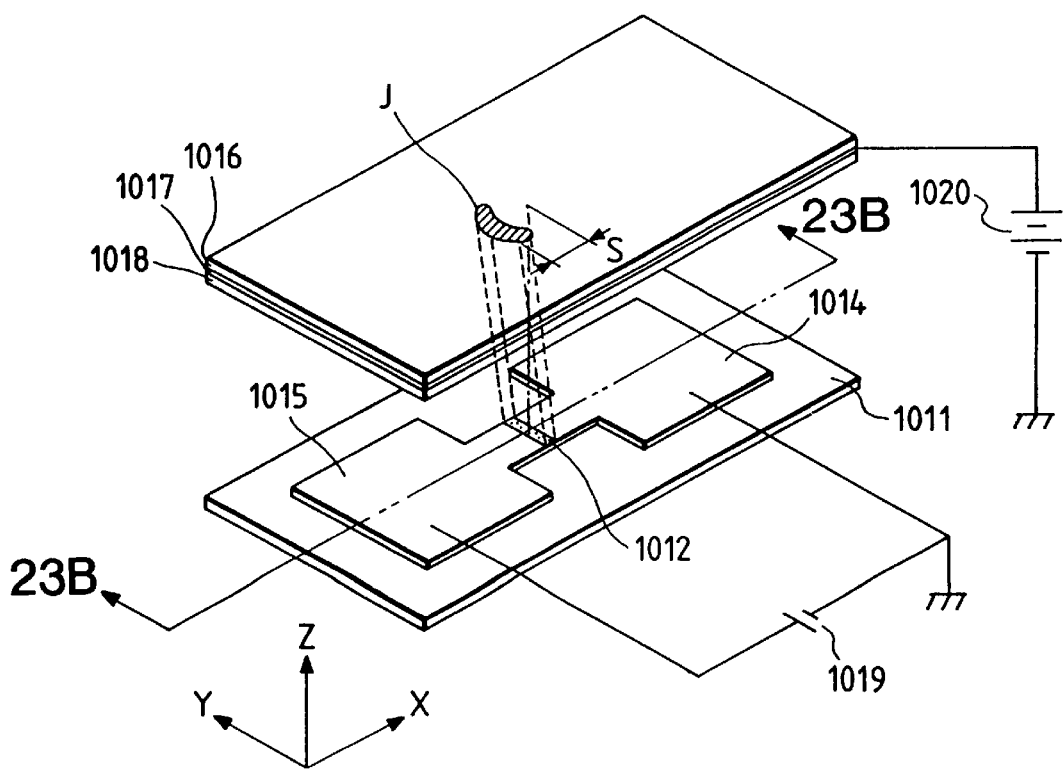
FIGS. 23A and 23B are an exploded schematic perspective view and a schematic sectional side view of a gauging apparatus to be used for testing the performance of a surface conduction electron-emitting device.
Figure 23B:
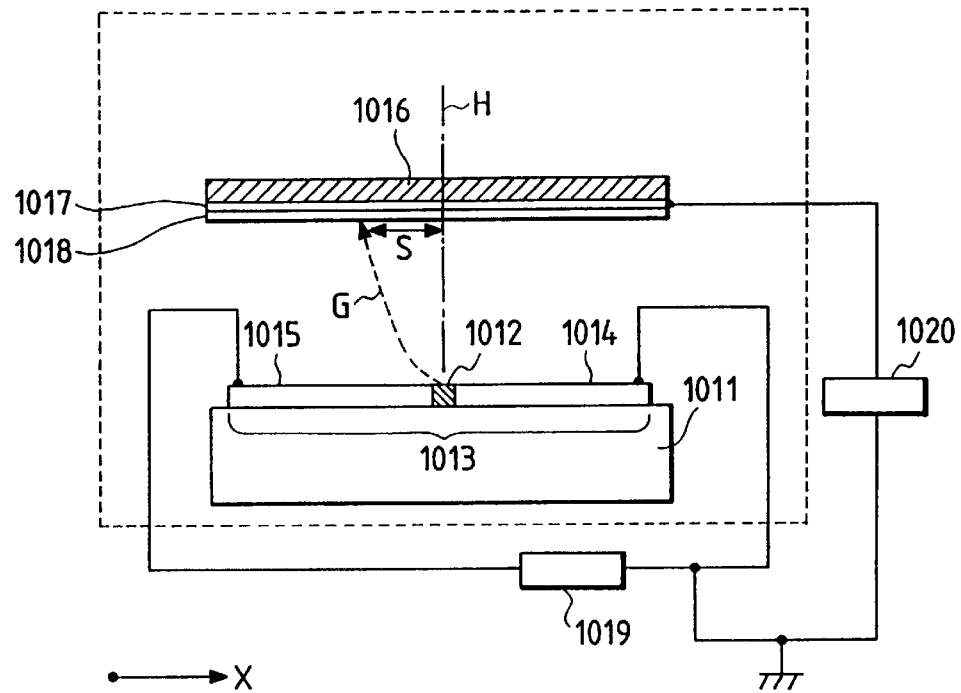

FIG. 23A is an exploded schematic perspective view and FIG. 23B is a schematic sectional side view taken along 23B—23B line of FIG. 23A of a gauging apparatus to be used for testing the performance of a surface conduction electron-emitting device in terms of electrons emitted from its electron-emitting region. Referring to FIGS. 23A and 23B, a surface conduction electron-emitting device to be tested comprises a substrate 1011, a pair of device electrodes 1014 and 1015 and a conductive film 1013 including an electron-emitting region 1012, whereas the gauging apparatus comprises a glass substrate 1016, an anode 1017 made of transparent conductive film, a fluorescent film 1018 that emits visible light when irradiated with electrons and a power source 1019 for applying a voltage to the electron-emitting device.

The device electrodes 1014 and 1015 are connected to the power source 1019 while the anode 1017 is connected to another power source 1020 and disposed above the electron-emitting device.

The anode 1017, the glass substrate 1016 carrying the fluorescent layer 1018 and the electron-emitting device are arranged within the gauging apparatus, the inside of which is held under a vacuum.

When a given voltage is applied to the device electrodes 1014 and 1015 (which are a lower potential electrode and a higher potential electrode respectively) to make the electron-emitting region 1012 emit electrons and a high voltage between several hundred and several thousands volts is applied to the anode 1017, the electrons emitted from the electron-emitting region are swerved (or deflected as referred to hereinafter) toward the higher potential electrode (device electrode 1015) from a normal (dotted line H in FIG. 23B) drawn relative to the surface of the insulator substrate 1011 from center of the electron-emitting region 1012 along the arrowed broken line G in FIG. 23B so that the center of the light emitting section J of the fluorescent film 1018 is displaced from the normal by distance S.

The behavior of the emitted electrons as described above is believed to be attributable to the fact that the distribution of electric potential on a plane parallel to the insulator substrate 1011 is asymmetric relative to the electron-emitting region and it is characteristic of the surface conduction electron-emitting device. (Note that the FE type and MIM type devices as described earlier may show such behavior depending on the device configuration.)

Thus, the present invention is based on a finding that an image-forming apparatus comprising electron-emitting devices that characteristically show the above described deflecting behavior can be made to avoid collisions of emitted electrons and the anti-atmospheric-pressure spacer disposed inside the apparatus without damaging the anti-atmospheric-pressure structure of the apparatus by appropriately arranging the spacer within the apparatus.

The present invention is also based on another finding that an image-forming apparatus of the type under consideration can be made to operate satisfactorily without damaging the fluorescent layer and/or the electron-emitting devices by appropriately arranging the spacer within the apparatus.

Now, a surface conduction electron-emitting device that can suitably be used for the purpose of the invention will be described.

Surface conduction electron-emitting devices to be used for the purpose of the present invention may be either of the flat type or of the upright type. Firstly, a flat type surface conduction electron-emitting device will be described.

Figure 28A:
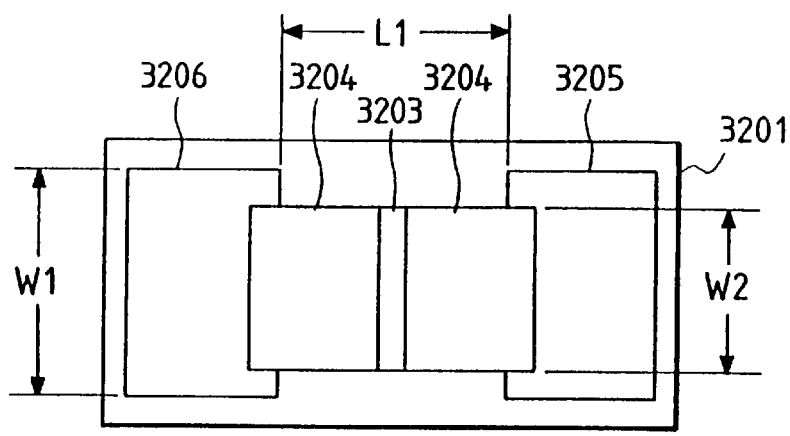
FIGS. 28A and 28B are a plan view and a side view of a flat type surface conduction electron-emitting device to be suitably used for an image-forming apparatus according to the invention, schematically showing its basic configuration.
Figure 28B:
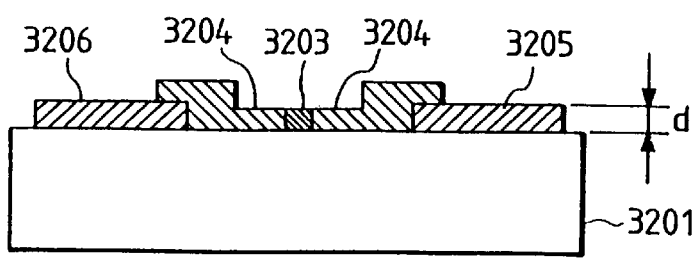

FIGS. 28A and 28B are a plan view and a side view of a flat type surface conduction electron-emitting device to be suitably used for an image-forming apparatus according to the invention, schematically showing its basic configuration.

Referring to FIGS. 28A and 28B, a surface conduction electron-emitting device of the type under consideration comprises a substrate 3201, a pair of device electrodes 3205 and 3206 and a thin film 3204 including an electron-emitting region 3203.

Materials that can be used for the substrate 3201 include quartz, glass containing impurities such as Na to a reduced concentration level, sodalime glass, glass substrate realized by forming an $SiO_2$ layer on sodalime glass by means of sputtering, ceramic substances such as alumina and silicon wafer.

While the oppositely arranged device electrodes 3205 and 3206 may be made of any highly conducting material, preferred candidate materials include metals such as Ni, Cr, Au, Mo, W, Pt, Ti, Al, Cu and Pd and their alloys, printable conducting materials made of a metal or a metal oxide selected from Pd, Ag, $RuO_2$, Pd—Ag and glass, transparent conducting materials such as $In_2O_3$—$SnO_2$ and semiconducting materials such as polysilicon.

The distance L1 separating the electrodes is between hundreds angstroms and hundreds micrometers and determined as a function of various technical aspects of the photolithography to be used for manufacturing the device, including the performance of the aligner and the etching method involved, and the voltage to be applied to the electrodes as well as the electric field strength designed for electron emission. Preferably it is between several micrometers and tens of several micrometers. The lengths W1 and the thickness d of the device electrodes 3205 and 3206 may be determined on the basis of the requirements involved in designing the device such as the resistances of the electrodes and the arrangement of a plurality of electron sources provided in the apparatus, although the length W1 of the electrodes is normally between several micrometers and several hundred micrometers and the thickness d of the device electrodes 3205 and 3206 is typically between several hundred angstroms and several micrometers.

The thin film 3204 of the device is arranged between the device electrodes 3205 and 3206 oppositely disposed on the substrate 3201 and includes the electron-emitting region 3203. While the thin film 3204 including the electron-emitting region 3203 is partly laid on the device electrodes 3205 and 3206 in FIG. 28B, it may alternatively be so arranged as to be located off the device electrodes 3205 and 3206 on the substrate 3201. If such is the case, a thin film for forming an electron emitting region is firstly formed on a substrate 3201 and, thereafter, a pair of oppositely arranged device electrodes 3205 and 3206 are depositted on the substrate 3201 to produce such a device.

Still alternatively, it may be so arranged that each of the areas of the thin film found between the oppositely arranged device electrodes 3205 and 3206 operate as an electron emitting region. The thickness of the thin film 3204 including the electron emitting region is preferably between several angstroms and several thousand angstroms and most preferably between 10 and 200 angstroms and is determined as a function of the stepped coverage of the thin film 3204 on the device electrodes 3205 and 3206, the resistance between the electron emitting region 3203 and the device electrodes 3205 and 3206, the mean size of the conducting particles of the electron emitting region 3203 and the parameters for the forming operation that will be described later as well as other factors. The thin film 3204 normally shows a sheet resistance between $10^3$ and $10^7$ $\Omega/\square$.

The thin film 3204 including the electron emitting region is made of fine particles of a material selected from metals such as Pd, Pt, Ru, Ag, Au, Ti, In, Cu, Cr, Fe, Zn, Sn, Ta, W and Pb, oxides such as PdO, $SnO_2$, $In_2O_3$, PbO and $Sb_2O_3$, borides such as $HfB_2$, $ZrB_2$, $LaB_6$, $CeB_6$, $YB_4$ and $GdB_4$, carbides such as TiC, ZrC, HfC, TaC, SiC and WC, nitrides such as TiN, ZrN and HfN, semiconductors such as Si and Ge, carbon, AgMg and NiCu.

The term "a fine particle film" as used herein refers to a thin film constituted of a large number of fine particles that may be loosely dispersed, tightly arranged or mutually and randomly overlapping (to form an island structure under certain conditions).

The electron emitting region 3203 is constituted of a large number of fine conductor particles with a mean particle size of between several and several thousands angstroms and preferably between 10 and 200 angstroms depending on the thickness of the thin film 3204 including the electron emitting region and a number of factors including the method selected for manufacturing the device and the parameters for the forming operation that will be described later. The material of the electron emitting region 3203 may be selected from all or part of the materials that can be used to prepare the thin film 3204 including the electron emitting region.

Now, a surface conduction type electron-emitting device having an alternative profile, or an upright electron-emitting device, will be described.

Figure 29:
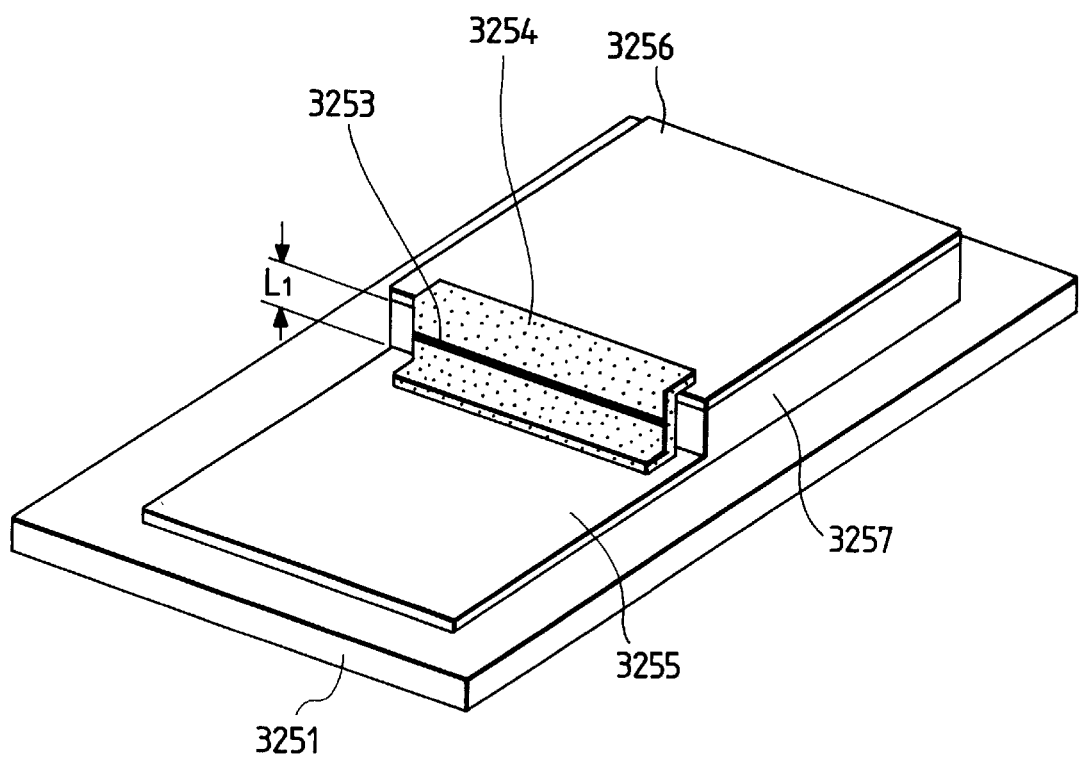
FIG. 29 is a perspective view of an upright type surface conduction electron-emitting device to be suitably used for an image-forming apparatus according to the invention, schematically showing its basic configuration.

FIG. 29 is a schematic perspective view of an upright type surface conduction electron-emitting device to be suitably used for the present invention.

As seen in FIG. 29, the device comprises a substrate 3251, a pair of device electron 3255 and 3256, a thin film 3254 including an electron emitting region and a step-forming section 3257. It should be noted here that the precise location of the electron emitting region 3253 can vary depending on the thickness of and the method for preparing the step-forming section 3257 as well as the thickness of and the method for preparing the thin film 3254 including the electron-emitting region and hence may not be same as the one indicated in FIG. 29.

Since the substrate 3251, the device electrodes 3255 and 3256 and the thin film 3254 including the electron emitting region 3253 of the device are prepared from the materials same as those of their counterparts of the flat type surface conduction electron-emitting device as described above, only the step-forming section 3257 and the thin film 3254 including the electron emitting region that characterize the upright type surface conduction electron-emitting device will be described in detail here.

The step-forming section 3257 is made of an insulating material such as $SiO_2$ and formed there by vacuum deposition, printing, sputtering or some other appropriate technique. The thickness of the step-forming section 3257 corresponds to the distance L1 separating the device electrodes of the flat type surface conduction electron-emitting device described above and is found between several hundreds angstroms and tens of several micrometers, although it is determined as a function of the technique selected for forming the step-forming section 3257, the voltage to be applied to the device electrodes and the electric field strength available for electron emission and preferably found between a thousand angstroms and 10 micrometers.

As the thin film 3254 including the electron emitting section is formed after the device electrodes 3255 and 3256 and the step-forming section 3257, it may preferably be formed on the device electrodes 3255 and 3256 or, if appropriate, so shaped as to be suitably arranged without being formed on the device electrodes 3255 and 3256 except small areas to be used for electrical connection. The thickness of the thin film 3254 including the electron emitting section is a function of the method of preparing it and, in many cases, varies on the step-forming section and on the device electrodes 3255 and 3256. Normally, the thin film 54 is made less thick on the step-forming section than on the electrodes. Consequently, the thin film can be electrically treated (electric forming) more easily than its counterpart of the flat type surface conduction electron-emitting device to produce an electron emitting region 3253.

Now, the present invention will be described in detail by way of preferred embodiments.

[Embodiment 1]

Figure 1A:
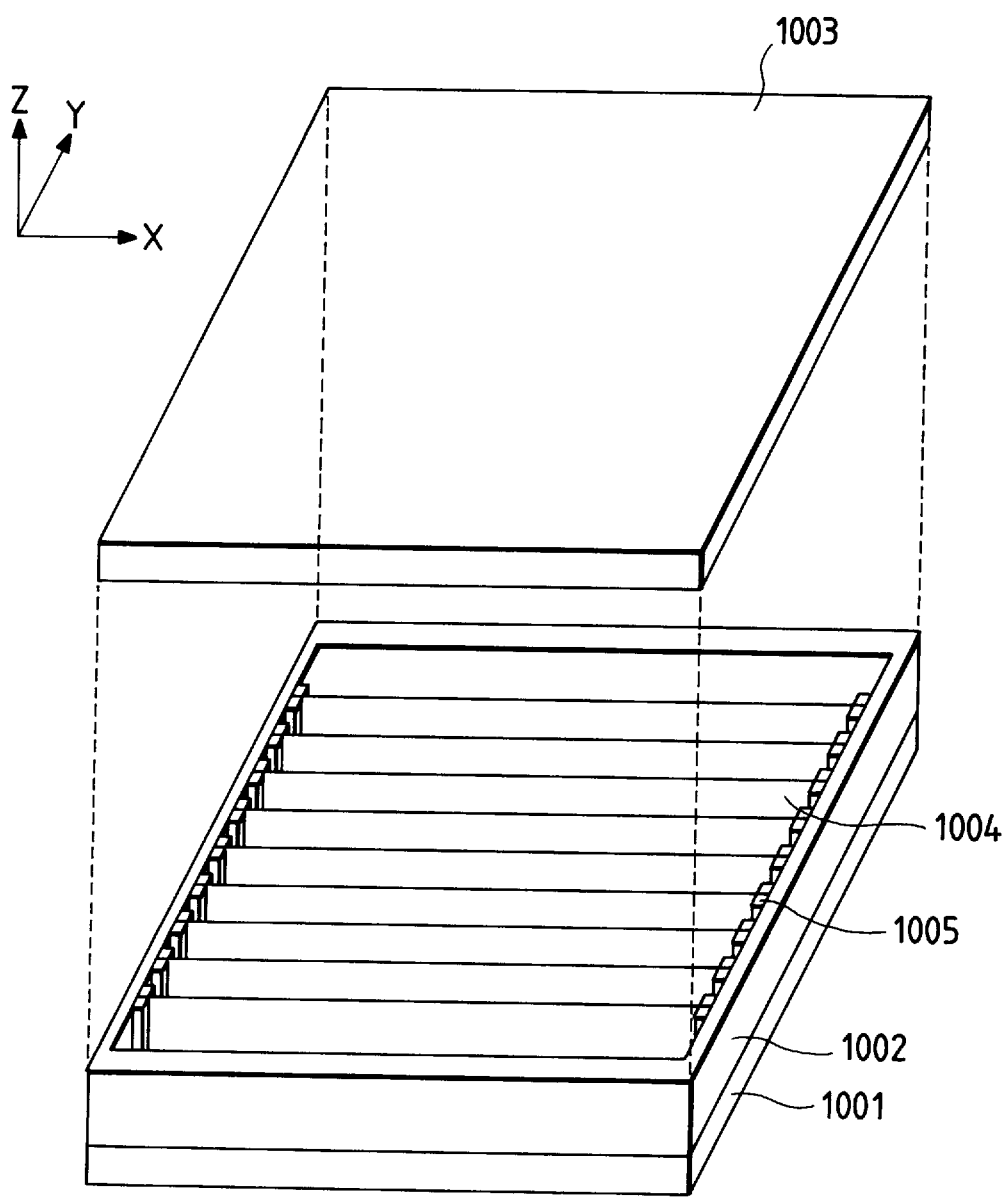
FIG. 1A is a schematic overall perspective view of a first embodiment of image-forming apparatus according to the invention.
Figure 1B:
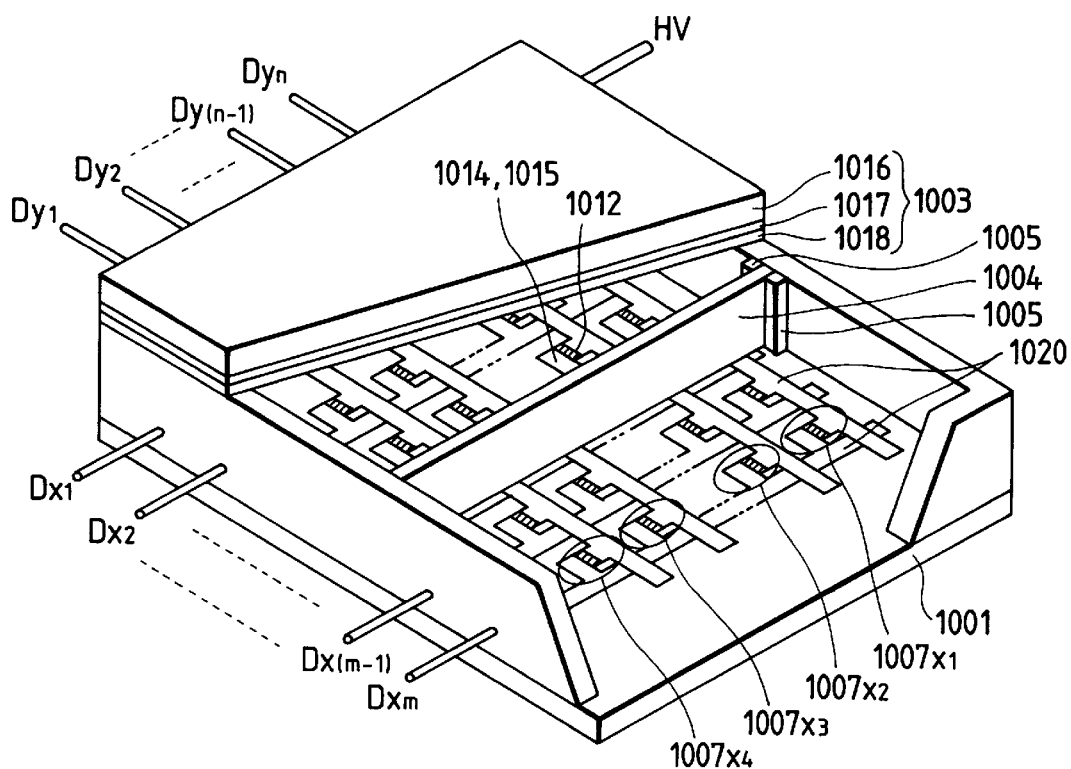
FIG. 1B is a partially cutaway schematic perspective view of the embodiment of FIG. 1A, which is also common to second through tenth embodiments of the invention.
Figure 2:
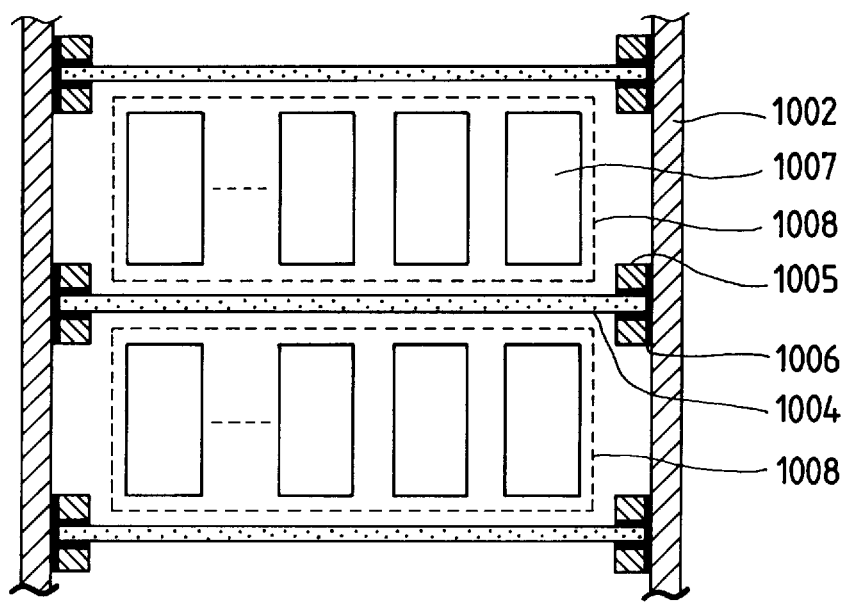
FIG. 2 is a partial sectional plan view of the embodiment of FIG. 1A taken along the X-Y plane.

FIGS. 1A and 1B schematically illustrate a first preferred embodiment of image-forming apparatus according to the invention. FIG. 1A is a schematic overall perspective view of the embodiment and FIG. 1B is a partially cutaway schematic perspective view of the embodiment, showing how electron-emitting devices are arranged therein when the anti-atmospheric-pressure spacers it comprises are removed therefrom. FIG. 2 is a partial sectional plan view of the embodiment of FIGS. 1A and 1B taken along X-Y plane when the face plate of the apparatus is removed therefrom.

Referring to FIGS. 1A, 1B and 2, the apparatus comprises a back plate 1001, an enclosure 1002, a face plate 1003, a number of anti-atmospheric-pressure spacers 1004 arranged substantially in parallel with the X-axis shown there, anchor blocks 1005 for rigidly holding the respective anti-atmospheric-pressure spacers, frit glass fixtures 1006 for rigidly fixing the anti-atmosphenic-pressure spacers with the anchor blocks 1005 to the enclosure 1002 and a number of electron-emitting devices 1007 formed on the back plate 1001, said electron-emitting devices being arranged in rows, each comprising a plurality of electron-emitting devices (which are denoted by 1007×1, . . . , 1007×4 and so on in FIG. 1B). Reference numeral 1020 denotes wires to be used for applying a voltage to the electron-emitting devices in order to cause them to emit electrons.

Note that, in this embodiment, the rows of electron-emitting devices 1008 and the anti-atmospheric-pressure spacers 1004 are alternately arranged and surface conduction electron-emitting devices are used for the electron-emitting devices, in each of which a pair of oppositely disposed device electrodes 1014 and 1015 are arranged along the X-axis in a manner as illustrated in FIGS. 23A and 23B.

Electron beams emitted from the electron-emitting device 1007 arranged in a manner as described above come to have a Z-directional velocity component as an accelerating voltage is applied thereto mainly between the back plate 1001 and the face plate 1003 and also a +X- or −X-directional velocity component as they are deflected toward the respective device anodes. The electron beams eventually collide with the respective fluorescent members of electron beam irradiation arranged on the inner surface of the face plate and cause the latter to emit light to form images on the display screen of the apparatus. Note that the anti-atmospheric-pressure spacers do not interfere with any of the electron beams being accelerated by the accelerating voltage so that the electron beams collide with the respective fluorescent members as if there were no anti-atmospheric-pressure spacers arranged within the apparatus.

In this embodiment, the anti-atmospheric-pressure spacers 1004 are arranged in positional agreement with the respective boundary gaps (black stripes), each separating adjacent fluorescent targets from each other. In other words, the anti-atmospheric-pressure spacers 1004 are not located vis-a-vis any of the fluorescent targets. Additionally, they are arranged on the back plate in areas that are not occupied by the electron-emitting devices. It should be noted that the above statement holds true throughout the embodiments described herein with regard to the present invention.

In this embodiment, each of the anti-atmospheric-pressure spacers 1004 is rigidly fixed to the face plate 1003 and/or the back plate 1001 by means of a frit glass fixture and held stationary by means of four anchor blocks, although each anti-atmospheric-pressure spacer may be held stationary with a reduced number of anchor blocks and fixed only to either the back plate or the face plate if such an arrangement ensures satisfactory strength and positional accuracy. Again, while each of the anti-atmospheric-pressure spacers is rigidly fixed to the enclosure 1002 at the opposite ends thereof in this embodiment, it may also be secured to the enclosure 1002 only at one end thereof if satisfactory strength and positional accuracy is ensured by such an arrangement.

Besides, while the anti-atmospheric-pressure spacers are secured to the enclosure in this embodiment, they may alternatively be secured to a support frame arranged inside the enclosure. Although frit glass fixtures are used to rigidly hold the anti-atmospheric-pressure spacers or the anchor blocks in this embodiment, an adhesive agent may alternatively be used for the same purpose. Again, the above statement on the use of a support frame and an adhesive agent holds true throughout the embodiments described herein with regard to the present invention.

While FIG. 1A illustrates an image-forming apparatus comprising ten rows of electron-emitting devices and FIG. 2 shows that each row comprises four electron-emitting devices, the number of rows and the number of devices in each row are not limited thereto and they may be varied appropriately. The inside of the embodiment is evacuated by means of an exhaust pipe (not shown) and a vacuum pump and the exhaust pipe (not shown) is molten to hermetically seal the enclosure when the inside is evacuated to a degree of vacuum of approximately $10^{-6}$ Torr.

[Embodiment 2]

Figure 3A:
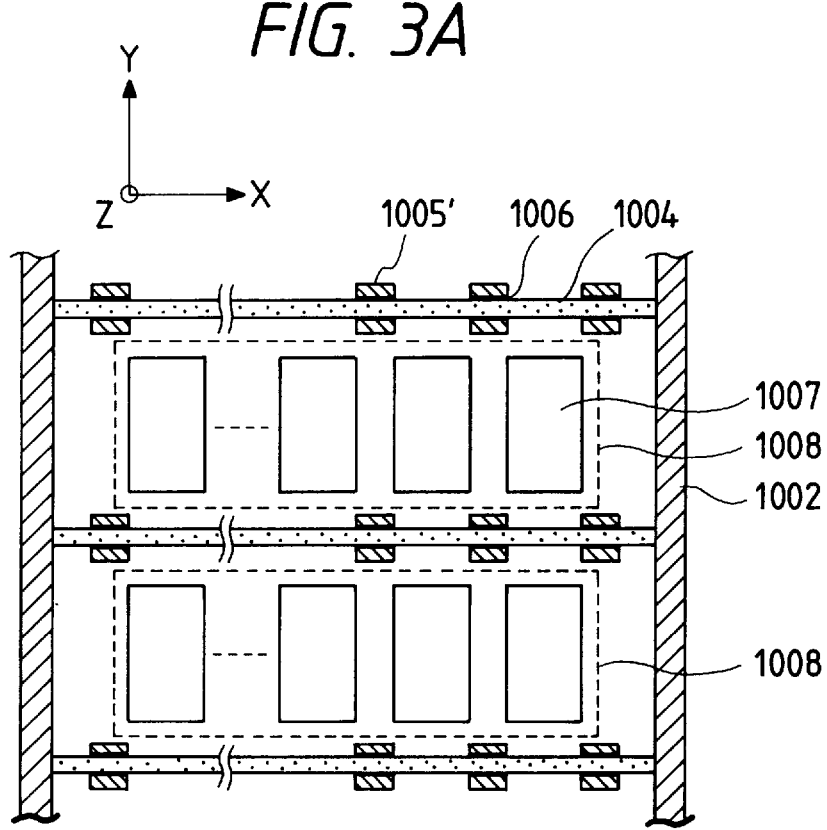
FIGS. 3A and 3B are a partial sectional plan view and a partial sectional side view of a second embodiment of the invention taken along the X-Y plane and X-Z plane respectively.
Figure 3B:
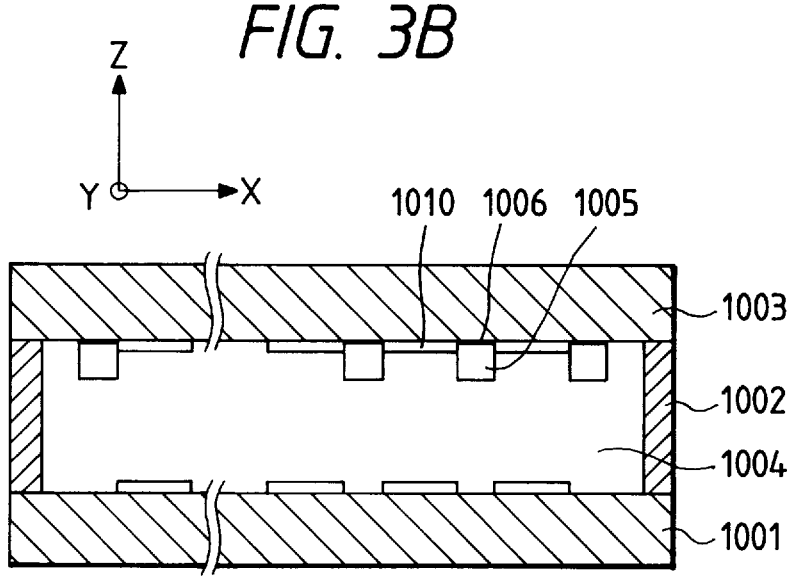

FIGS. 3A and 3B illustrate a second embodiment of image-forming apparatus according to the invention. FIG. 3A shows a partial sectional plan view taken along X-Y plane while FIG. 3B shows a partial sectional side view taken along X-Z plane.

Referring to FIGS. 3A and 3B, the embodiment comprises fluorescent targets 1010 formed on a face plate 1003 and anchor blocks 1005' for rigidly holding anti-atmospheric-pressure spacers 1004 to a face plate 1003.

This embodiment is characterized in that the anchor blocks 1005' for supporting and rigidly holding the anti-atmospheric-pressure spacers 1004 are arranged off the tracks of electron beams and fitted onto the face plate 1003 by means of frit glass fixtures.

Note that the anchor blocks 1005' may alternatively be fitted onto the back plate 1001 or both the face plate 1003 and the back plate 1001 if they do not interfere with the tracks of electron beams in the apparatus.

A more rigid anti-atmospheric-pressure structure may be obtained for this embodiment if anchor blocks 1005 of the type used in the first embodiment are also used in combination with the anchor blocks 1005' and fitted to the enclosure of this embodiment.

[Embodiment 3]

Figure 4:
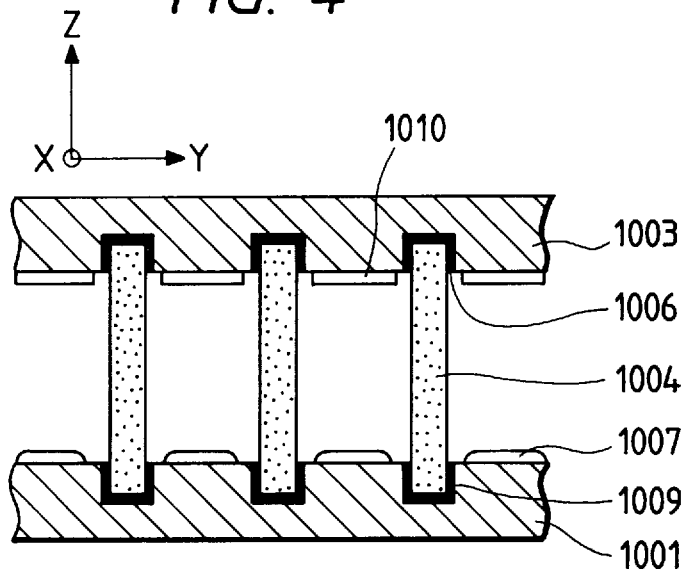
FIG. 4 is a partial sectional side view of a third embodiment of the invention taken along the X-Z plane.
Figure 5:
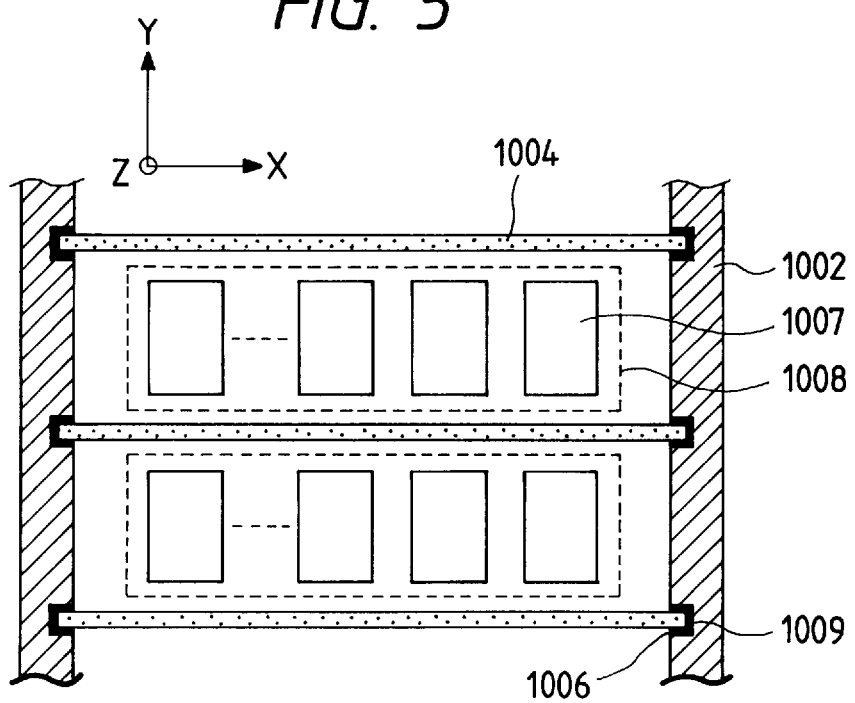
FIG. 5 is a partial sectional plan view of the embodiment of FIG. 4 taken along the X-Y plane.

FIGS. 4 and 5 illustrate a third embodiment of image-forming apparatus according to the invention. FIG. 4 is a partial sectional side view of a third embodiment of the invention taken along X-Z plane and FIG. 5 is a partial sectional plan view of the embodiment of FIG. 4 taken along X-Y plane.

Referring to FIGS. 4 and 5, reference numeral 1009 denotes grooves for receiving respective anti-atmospheric-pressure spacers 1004, which are rigidly fitted into the grooves 1009 by means of frit glass fixtures 1006.

Note that this embodiment differs from Embodiment 1 only in that grooves are provided for rigidly holding anti-atmospheric-pressure spacers in this embodiment.

This embodiment is characterized in that anti-atmospheric-pressure spacers 1004 are arranged along grooves 1009 so that the former may be securely and accurately bonded to the support members without difficulty.

As seen in FIG. 4, grooves 1009 are formed in the face plate 1003 and the back plate 1001 as well as in the enclosure 1002 of this embodiment for securely receiving respective anti-atmospheric-pressure spacers 1004, although such grooves may alternatively be formed only in one or some of the face plate, the back plate, the enclosure and the support frame arranged inside the enclosure.

While grooves are used for securely holding anti-atmospheric-pressure spacers in this embodiment, anchor blocks of the type used for holding anti-atmospheric-pressure spacers in Embodiments 1 and 2 may advantageously be used in combination with grooves in this embodiment. If such is the case, grooves are also arranged in areas that are not occupied by the electron-emitting devices or the fluorescent targets of the embodiment.

[Embodiment 4]

Figure 1C:
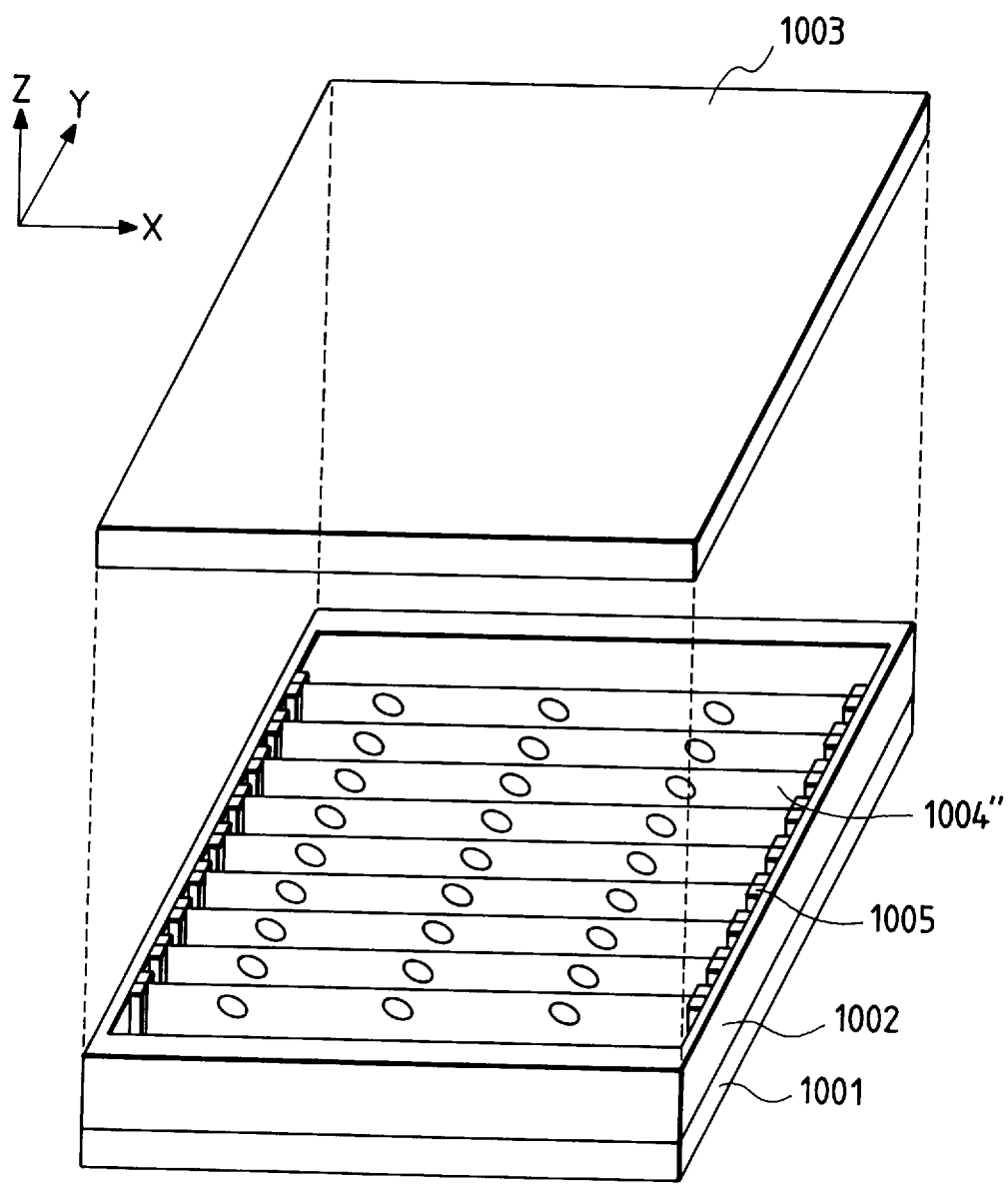
FIG. 1C is a schematic overall perspective view of a fourth embodiment of an image-forming apparatus according to the invention.

FIG. 1C illustrates a fourth embodiment of image-forming apparatus according to the invention. This embodiment differs from the first embodiment only in that the anti-atmospheric-pressure spacers 1004 of the first embodiment are replaced by anti-atmospheric-pressure spacers 1004", each of which is prepared by boring holes through an anti-atmospheric-pressure spacer of the type used for the first embodiment.

[Embodiment 5]

Figure 7:
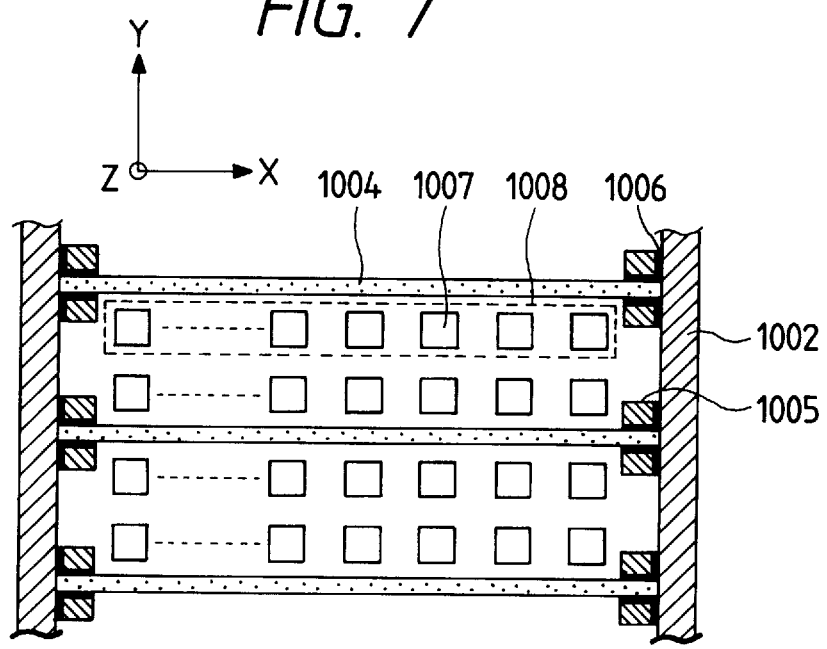
FIG. 7 is a partial sectional plan view of a fifth embodiment of the invention taken along the X-Y plane.

FIG. 7 is a partial sectional view of a fifth embodiment of image-forming apparatus according to the present invention taken along X-Y plane.

This embodiment differs from the first embodiment only in that a row of anti-atmospheric-pressure spacers 1004 are made responsible for a plurality of rows of electron-emitting devices 1008.

It should be noted that the second and third embodiments can be modified so that a single row of anti-atmospheric-pressure spacers are made responsible for a plurality of rows of electron-emitting devices as in the case of this embodiment.

[Embodiment 6]

Figure 6:
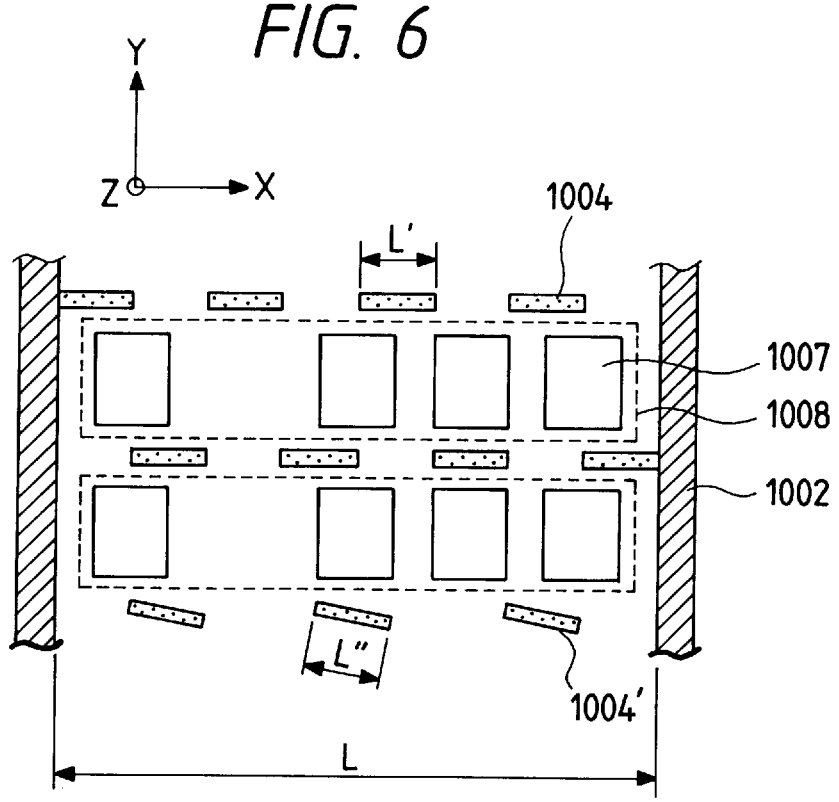
FIG. 6 is a partial sectional plan view of a sixth embodiment of the invention taken along the X-Y plane.

FIG. 6 is a partial sectional plan view of a sixth embodiment of image-forming apparatus according to the present invention.

Referring to FIG. 6, the embodiment comprises two types of anti-atmospheric-pressure spacers 1004 and 1004' having respective length L' and L", which are smaller than the length of its enclosure 1002 along the X-axis. The spacers are rigidly fitted into grooves formed on either the face plate or the back plate as described earlier by referring to the third embodiment. The rows of electron-emitting devices and those of anti-atmospheric-pressure spacers are alternately arranged as in the case of the first, second and third embodiments.

While the anti-atmospheric-pressure spacers 1004 are arranged substantially in parallel with the direction of deflection (X-direction) of electron beams emitted from the electron-emitting devices 1007, the anti-atmospheric-pressure spacers 1004' are slightly inclined from the X-axis. Note that the inclination of the spacers 1004' does not affect the tracks of electron beams in the apparatus.

The anti-atmospheric-pressure spacers of this embodiment may alternatively be anchored by means of anchor blocks as described earlier by referring to the first and second embodiments. When the anti-atmospheric-pressure spacers are not secured to the enclosure, they are rigidly fitted onto either the face plate or the back plate.

By using spacers having a length of L' or L" which is smaller than the length L of the enclosure along the X-axis, the inside of the apparatus can be evacuated highly efficiently. Additionally, the inside of the apparatus can be maintained to a high degree of vacuum while using spacers having a relatively small surface area.

[Embodiment 7]

Figure 8:
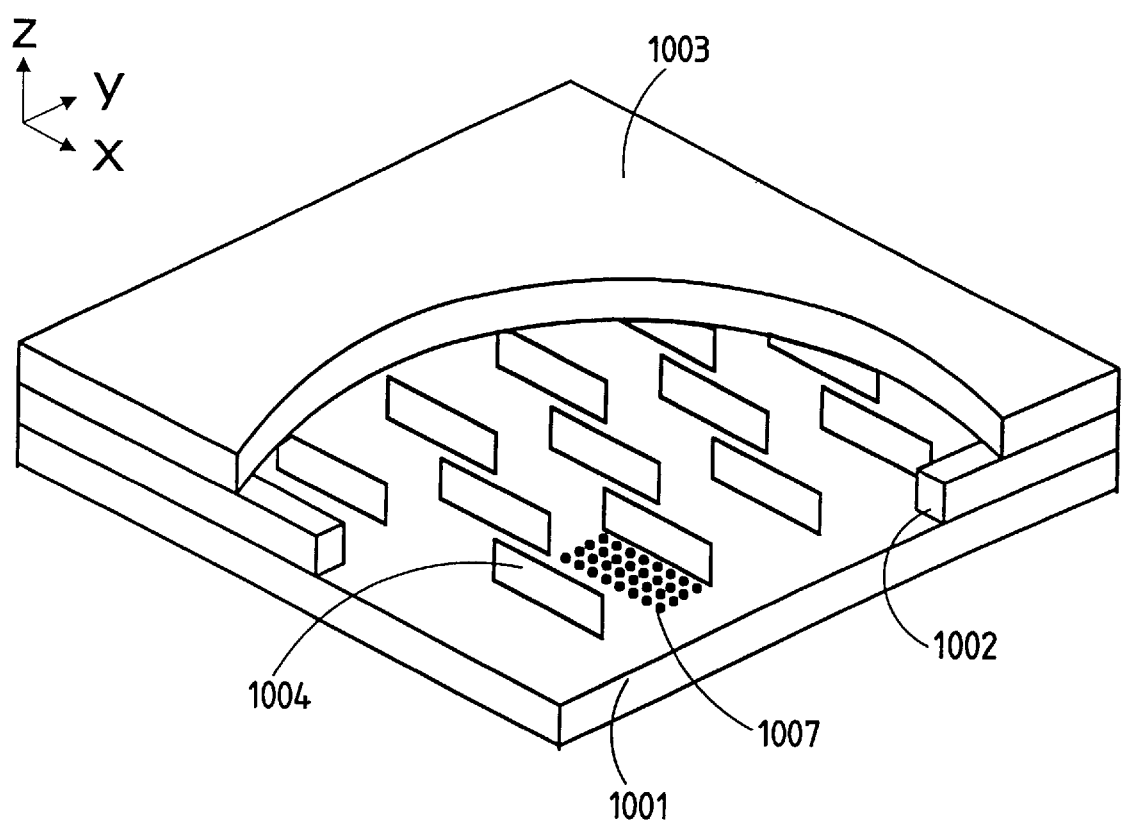
FIG. 8 is a partially cutaway schematic perspective view of a seventh embodiment of the invention.
Figure 9:
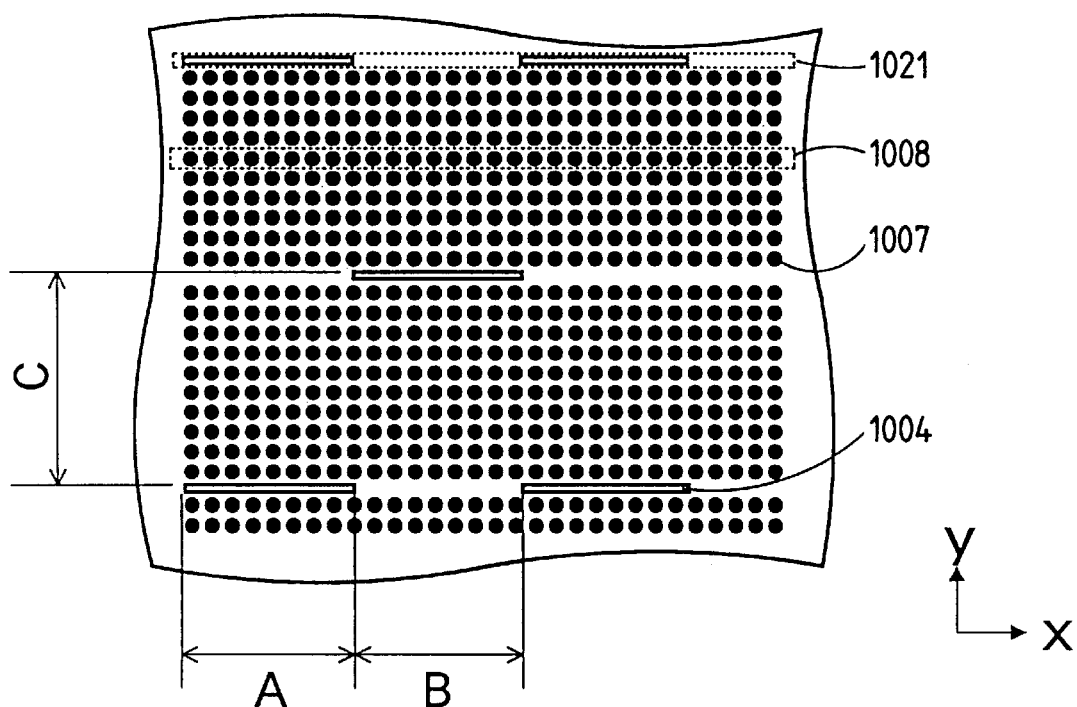
FIG. 9 is an enlarged partial sectional plan view of the embodiment of FIG. 8 taken along the X-Y plane.

FIGS. 8 and 9 illustrate a seventh embodiment of image-forming apparatus according to the invention. FIG. 8 is a partially cutaway schematic perspective view of the embodiment and FIG. 9 is an enlarged partial sectional plan view of the embodiment taken along X-Y plane. Referring to FIGS. 8 and 9, this embodiment comprises rows 1021 of anti-atmospheric-pressure spacers 1004 arranged along the X-axis and rows 1008 of electron-emitting devices 1007 also arranged along the X-axis. The positional relationship between the rows 1008 of electron-emitting devices 1007 and the rows 1021 of anti-atmospheric-pressure spacers 1004 is same as that of the first embodiment.

All the anti-atmospheric-pressure spacers 1004 comprised in this embodiment are identically small and have a length of A along the X-axis and adjacent anti-atmospheric-pressure spacers are separated from each other by a distance B in each row 1021 of anti-atmospheric-pressure spacers. In other words, each row 1021 of anti-atmospheric-pressure spacers 1004 of this embodiment comprises a plurality of spacers arranged along a line in parallel with the X-axis, each having a length A and any adjacent ones being separated from each other by a distance B in the row.

Then, two adjacent rows 1021 of anti-atmospheric-pressure spacers are arranged in such a way that one of the rows is displaced along the X-axis by a distance of (A+B)/2 relative to the other and the two rows are separated in Y-direction by ten rows of electron-emitting devices or a distance of C. All the rows of anti-atmospheric-pressure spacers are arranged in this manner within the image-forming apparatus.

In an experiment conducted by the inventors of the present invention for this embodiment, anti-atmosphericpressure spacers made of glass and having a length A of 40 mm, a thickness along the Y-axis of 0.2 mm and a height along the Z-axis of 3 mm were arranged within an image-forming apparatus according to the invention in such a way that any two adjacent anti-atmospheric-pressure spacers were separated from each other by a distance B along the X-axis of 40 mm in a same row and any two adjacent rows of anti-atmospheric-pressure spacers were separated from each other by a distance C along the Y-axis of 15 mm. Both the face plate and the back plate of the apparatus were square and had 300 mm long edges and a thickness of 3 mm. Then, a plurality of small anti-atmospheric-pressure spacers were arranged in each row in parallel with or substantially in parallel with the electron beams emitted from the electron-emitting devices of the apparatus and zigzag in directions perpendicular to the direction of electron beams. With such an arrangement, the inside of the apparatus could be evacuated effectively and efficiently to a high degree of vacuum. Additionally, since the surface area of each spacer was significantly reduced, the apparatus could maintain the improved internal vacuum condition for a prolonged period of time.

[Embodiment 8]

Figure 10:
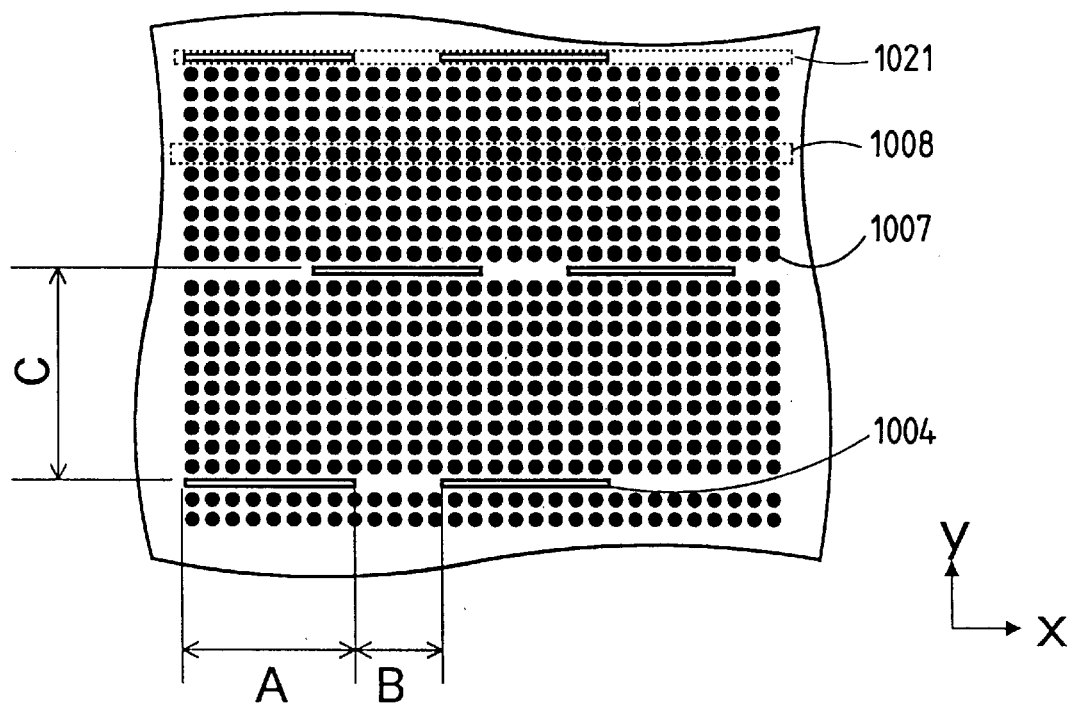
FIG. 10 is an enlarged partial sectional plan view of an eighth embodiment of the invention taken along the X-Y plane.

FIG. 10 is an enlarged partial sectional plan view of an eighth embodiment of image-forming apparatus according to the invention taken along X-Y plane, where the face plate is removed.

This embodiment is similar to the seventh embodiment and differs from the latter only in the distance separating any two adjacent anti-atmospheric-pressure spacers.

In an experiment conducted by the inventors of the present invention for this embodiment, anti-atmospheric-pressure spacers made of glass and having a length A of 40 mm, a thickness along the Y-axis of 0.2 mm and a height along the Z-axis of 3 mm were arranged within an image-forming apparatus according to the invention in such a way that any two adjacent anti-atmospheric-pressure spacers were separated from each other by a distance B of 30 mm along the X-axis in a same row and any two adjacent rows of anti-atmospheric-pressure spacers were separated from each other by a distance C along the Y-axis of 20 mm. Both the face plate and the back plate of the apparatus were square and had 300 mm long edges and a thickness of 3 mm.

With this arrangement, the inside of the apparatus could be evacuated effectively and efficiently to a high degree of vacuum and the apparatus could maintain the improved internal vacuum condition for a prolonged period of time as in the case of Embodiment 7.

[Embodiment 9]

Figure 11:
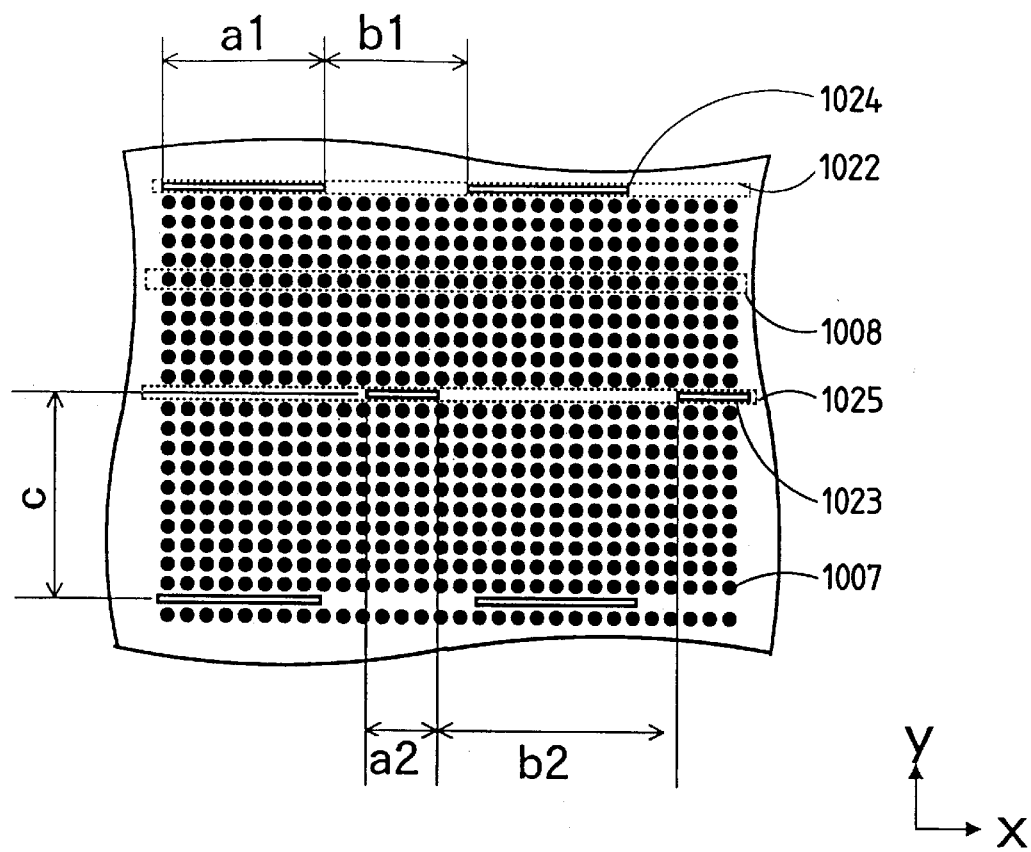
FIG. 11 is an enlarged partial sectional plan view of a ninth embodiment of the invention taken along the X-Y plane.

FIG. 11 is an enlarged partial sectional plan view of a ninth embodiment of image-forming apparatus according to the invention taken along X-Y plane, where the face plate is removed.

This embodiment is similar to the seventh and eighth embodiments and differs from the latter only in that rows of anti-atmospheric-pressure spacers with different sizes are alternately arranged.

Referring to FIG. 11, a row 1022 of anti-atmospheric-pressure spacers 1024 of a first type and a row 1025 of anti-atmospheric-pressure spacers 1023 of a second type are adjacently arranged. The anti-atmospheric-pressure spacer 1024 of the first type has a length of a1 along the X-axis, whereas the anti-atmospheric-pressure spacer 1023 of the second type has a length of a2 along the X-axis. Any two adjacent anti-atmospheric-pressure spacers 1024 of the first type are separated from each other by a distance of b1 along the X-axis in each row 1022 of anti-atmospheric-pressure spacers 1024 of the first type running along the X-axis, whereas any two adjacent anti-atmospheric-pressure spacers 1023 of the second type are separated from each other by a distance of b2 along the X-axis in each row 1025 of anti-atmospheric-pressure spacers 1023 of the second type running along the X-axis. Then, each row 1022 of anti-atmospheric-pressure spacers 1024 of the first type is separated from any adjacent row 1025 of anti-atmospheric-pressure spacers 1023 of the second type by ten rows of electron-emitting devices or a distance of C.

In an experiment conducted by the inventors of the present invention for this embodiment, anti-atmospheric-pressure spacers 1024 of the first type were made of glass and had a length a1 of 40 mm, a thickness along the Y-axis of 0.2 mm and a height along the Z-axis of 3 mm, whereas anti-atmospheric-pressure spacers 1023 of the second type were also made of glass but had a length a2 of 10 mm, a thickness along the Y-axis of 0.2 mm and a height along the X-axis of 3 mm. Any two adjacent anti-atmospheric-pressure spacers 1024 of the first type were separated from each other by a distance b1 along the X-axis of 40 mm in a row, whereas any two adjacent anti-atmospheric-pressure spacers 1023 of the second type were separated from each other by a distance b2 along the X-axis of 70 mm in a row. Any two adjacent rows of anti-atmospheric-pressure spacers were separated from each other by a distance c along the Y-axis of 15 mm. Both the face plate and the back plate of the apparatus were square and had 300 mm long edges and a thickness of 3 mm.

With this arrangement, the inside of the apparatus could be evacuated effectively and efficiently to a high degree of vacuum and the apparatus could maintain the improved internal vacuum condition for a prolonged period of time as in the case of Embodiment 7.

[Embodiment 10]

Figure 12:
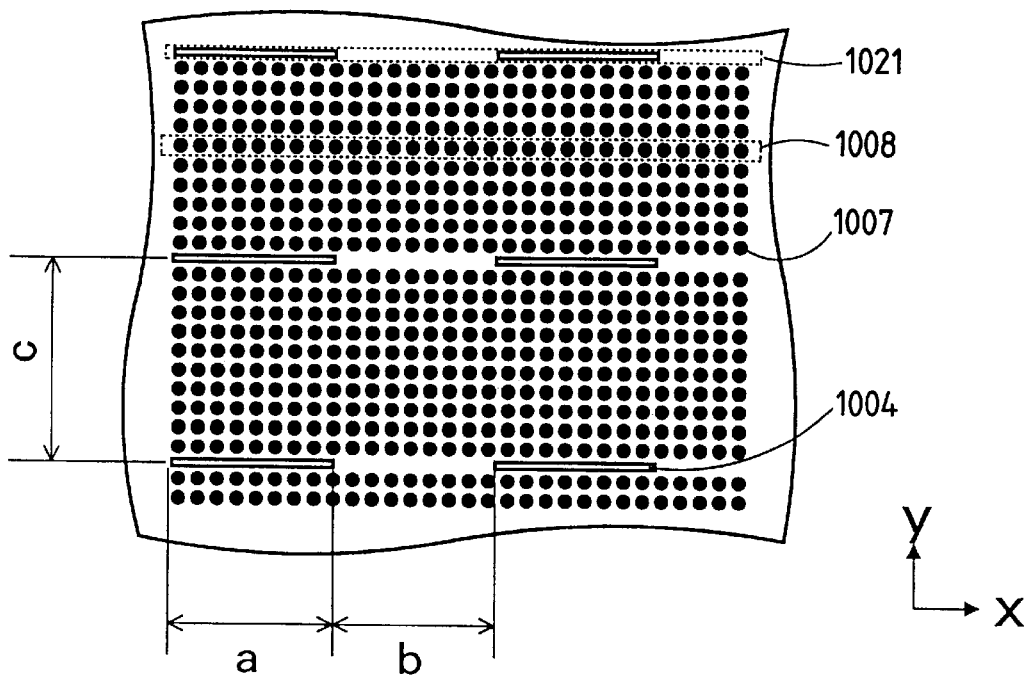
FIG. 12 is an enlarged partial sectional plan view of a tenth embodiment of the invention taken along the X-Y plane.

FIG. 12 is an enlarged partial sectional plan view of a tenth embodiment of image-forming apparatus according to the invention taken along X-Y plane, where the face plate is removed.

This embodiment is characterized in that identical anti-atmospheric-pressure spacers are used to form rows of anti-atmospheric-pressure spacers and any two adjacent rows of anti-atmospheric-pressure spacers are arranged along the X-axis in such a way that they are symmetrical relative to a line along the X-axis.

Referring to FIG. 12, each row 1021 of anti-atmospheric-pressure spacers comprises a given number of identical anti-atmospheric-pressure spacers 1004 having a length along the X-axis of a and separated from any adjacent anti-atmospheric-pressure spacer by a distance along the X-axis of b. Then, any two adjacent rows 1021 of anti-atmospheric-pressure spacers are separated from each other by a distance along the Y-axis of c.

In an experiment conducted by the inventors of the present invention for this embodiment, anti-atmospheric-pressure spacers 1021 made of glass and having a length a of 50 mm, a thickness along the Y-axis of 0.2 mm and a height along the Z-axis of 3 mm were arranged within an image-forming apparatus according to the invention in such a way that any two adjacent of anti-atmospheric-pressure spacers are separated from each other by a distance b along the X-axis of 40 mm in a same row and any two adjacent rows of anti-atmospheric-pressure spacers were separated from each other by a distance c long the Y-axis of 15 mm. Both the face plate and the back plate of the apparatus were square and had 300 mm long edges and a thickness of 3 mm.

With this arrangement, the inside of the apparatus could be evacuated effectively and efficiently to a high degree of vacuum and the apparatus could maintain the improved internal vacuum condition for a prolonged period of time as in the case of Embodiment 7.

[Embodiment 11]

Figure 13:
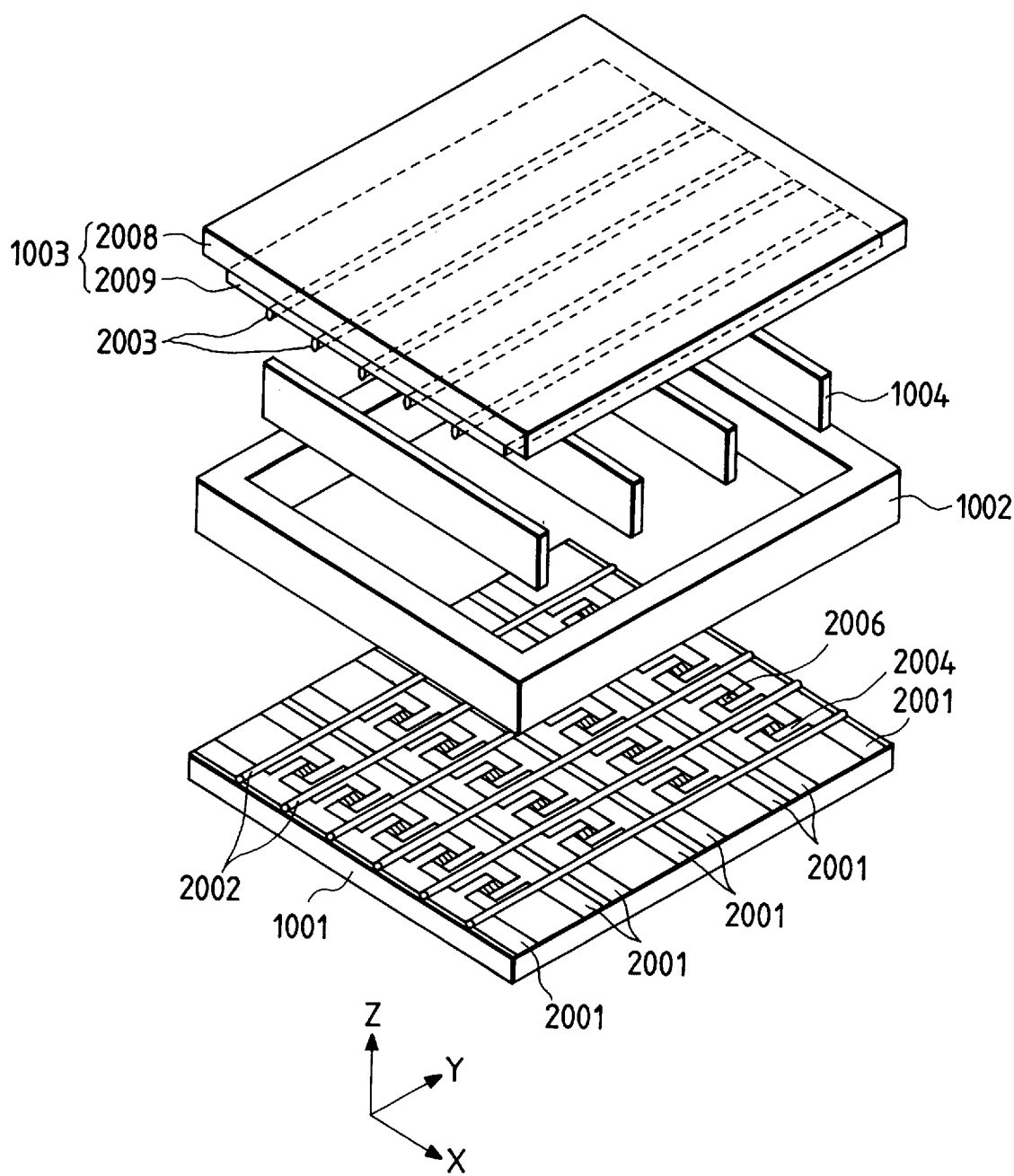
FIG. 13 is an exploded schematic perspective view of an eleventh embodiment of the invention, showing its principal components and their arrangement.
Figure 14:
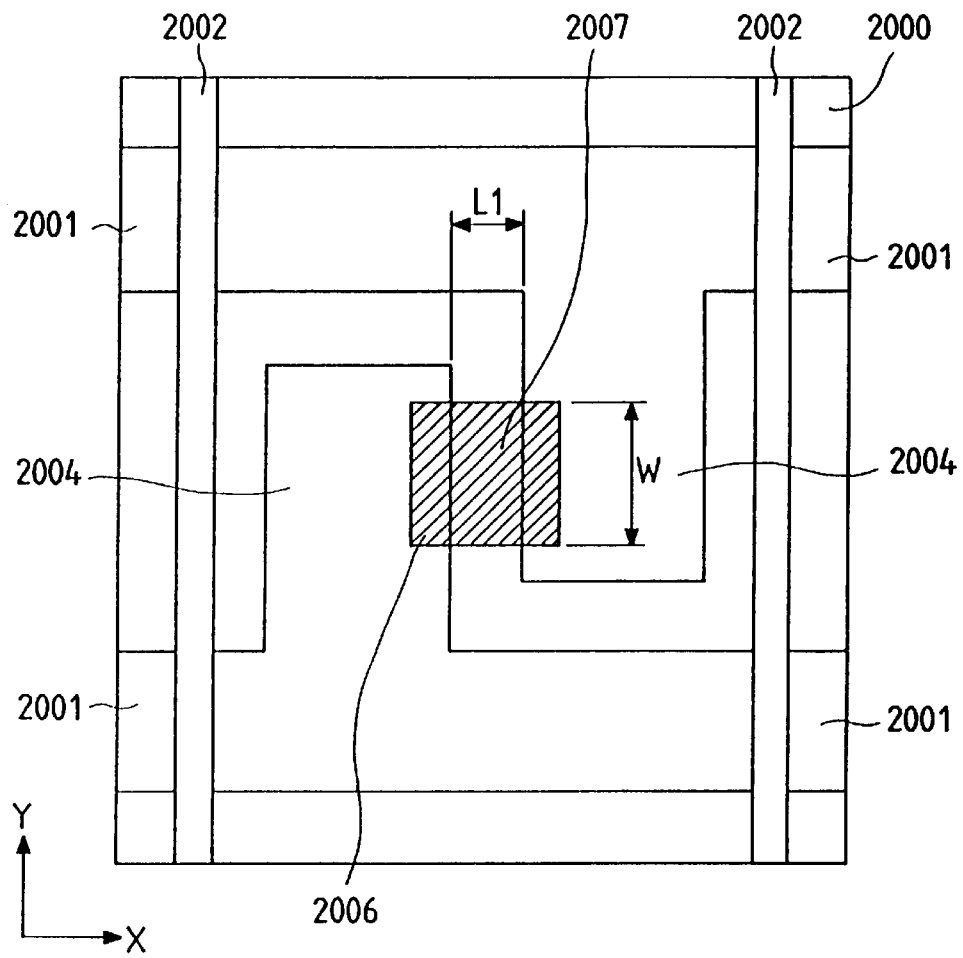
FIG. 14 is an enlarged schematic plan view of an electron-emitting region of an electron-emitting device to be used for the embodiment of FIG. 13.

FIGS. 13 and 14 illustrate an eleventh embodiment of image-forming apparatus according to the invention.

Referring to FIGS. 13 and 14, the embodiment comprises a glass substrate 1001 and a number of electron-emitting devices, wires 2001, device electrodes 2004 and electron-emitting regions 2006, as well as an enclosure 1002, a number of anti-atmospheric-pressure spacers 1004 and a face plate 1003 having a plate glass 2008 and a fluorescent layer 2009 arranged on the inner surface of the plate glass 2008. It also comprises a number of device-side ribs 2002 having a height (thickness) greater than those of the electrodes 2001, 2004 and a number of fluorescent-layer-side ribs 2003 having a height (thickness) greater than that of the fluorescent layer 2009.

In this embodiment, both the device-side ribs 2002 and the fluorescent-layer-side ribs 2003 are arranged in contact with the spacers 1004 running (along X-direction) perpendicularly relative to the ribs.

It should be noted, however, that the arrangement and the shapes of device-side ribs and fluorescent-layer-side ribs are not limited to those illustrated in FIG. 13 and may be subjected to various modifications. Also note that a number of grid electrodes (not shown) are also arranged for modulation within the apparatus.

Figure 15:
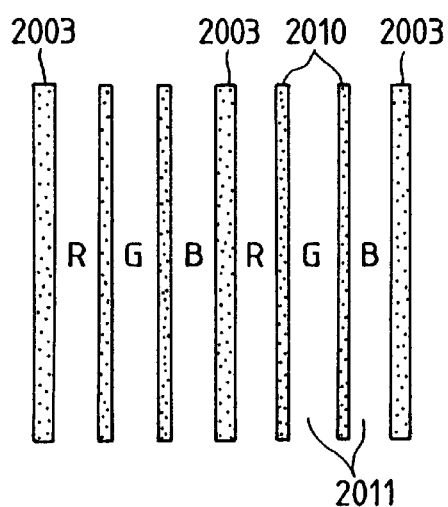
FIG. 15 is an enlarged schematic partial plan view of the fluorescent layer of the embodiment of FIG. 13.

FIG. 14 is an enlarged schematic plan view of an electron-emitting device to be used for this embodiment. In FIG. 14, the thin film including an electron-emitting region of the device is shown as a shaded area and denoted by reference numeral 2006. FIG. 15 is an enlarged schematic partial plan view of the fluorescent layer of this embodiment. Referring to FIG. 15, each of the fluorescent-layer-side ribs 2003 is realized in the form of a stripe such that it may be accurately formed on a black stripe 2010 arranged between any two adjacent fluorescent member of red (R), green (G) or blue (B). The fluorescent layer 2009 is lined with a metal back layer (not shown).

In an experiment conducted by the inventors of the present invention, an image-forming apparatus having a configuration same as the above embodiment was prepared in a manner as described above.

(1) A glass substrate 1000 was thoroughly cleaned in an organic solvent and, thereafter, an electrode layer of nickel (Ni) was formed on the substrate 1000 to a thickness of 1,000 Å. (See FIGS. 13 and 14.) Then, a plurality of wires 2001 were formed with respective device electrodes 2004 along a direction perpendicular to the stripe-shaped fluorescent members arranged on the face plate side (along X-direction in FIG. 14) such that a pair of closely located device electrodes 2004 were separated from each other by a distance (L1 in FIG. 14) of 3 μm and respectively connected to a pair of related wire sections 2001.

(2) After applying an organic palladium (ccp-4230 available from Okuno Pharmaceutical Co., Ltd.) containing solution to the glass substrate 1000, the latter was heat-treated at 300° C. for ten minutes to form a film of fine particles of palladium oxide. Then, the film was subjected to a patterning operation, involving etching, to produce thin films 2006 for forming electron-emitting regions, each located between a pair of device electrodes 2004. (See FIG. 14.) Each of the thin film 2006 for forming an electron-emitting region was made to have a film thickness of 100 Å and sheet resistance of 5×10Ω/□. The term "a fine particle film" as used herein refers to a thin film constituted of a large number of fine particles that may be loosely dispersed, tightly arranged or mutually and randomly overlapping (to form an island structure under certain conditions) and, whenever the expression "mean particle size" is employed, it refers only to that of recognizable fine particles.

(3) Thereafter, a given voltage was applied to the device sections 2004 of the device electrode layer 2005 to expose them to an electrically energizing process referred to as "electric forming" and produce an electron-emitting region between each appropriate pair of device sections 2004 of the device electrode 2005.

(4) As a number of electron-emitting devices were prepared along a plurality of rows of wire sections 2001, device-side ribs 2002 were then arranged in such a way that each rib 2002 runs at the middle between any two adjacent devices arranged along a wire section (X-direction). In other words, the ribs were arranged along the Y-axis in FIG. 14. The device-side ribs 2002 were made of frit glass having a low melting point and formed there by printing such that each of the ribs had a width and a height equal to 100 μm.

(5) Then, the face plate 1003 was prepared in a manner as described below.

After thoroughly cleaning a glass substrate 2008 in a solution containing hydrofluoric acid, black stripes 2010 were formed thereon by photolithography, using graphite for a principal ingredient. (See FIG. 15.) Thereafter, a color fluorescent layer 2009 was formed on the glass substrate 2008 by means of a so-called slurry method, a technique popularly used for manufacturing CRTs, where each of coloring fluorescent materials for red, green and blue was mixed with photoresist to reduce it into a slurry-like state and then applied onto the glass substrate 2008 to produce stripe-shaped fluorescent members 2011 until stripes of all the three primary colors were formed. The formed stripes were then photographically developed and fixed. The fluorescent members 2011 were satisfactory in that they were evenly formed with a thickness ranging between 20 and 30 μm.

(6) Thereafter, the surface of the fluorescent layer 2009 was smoothed by using a technique called "filming" and then a metal back layer (not shown) of aluminum was evenly formed on the inner surface of the fluorescent layer 2009 to a thickness of approximately 2,000 Å by vacuum deposition.

(7) After producing the fluorescent layer 2009 and the metal back, fluorescent-layer-side ribs 2003 of frit glass were formed thereon to a thickness and a width of 100 μm in such a way that each of the ribs 2003 was formed exactly on every third black stripe 2010 and therefore each rib was made responsible for three fluorescent members of different primary colors.

(8) The substrate 2000 carrying thereon a number of electron-emitting devices and the face plate 1003 were then oppositely disposed with a plurality of anti-atmospheric-pressure spacers 1004 and an enclosure 1002 arranged therebetween and frit glass was applied to the areas of the face plate 1003, the enclosure 1002 and the substrate 2000 to be bonded together before they were baked in the air or in a nitrogen atmosphere at temperature between 400° C. and 500° C. for more than ten minutes to hermetically seal the assembly of the components. Note that a number of grid electrodes (not shown) were also arranged for modulation within the embodiment. Then, identical pieces of plate glass, each having a height of 5 mm and a thickness of 200 μm, were arranged as so many spacers along a direction (X-direction) perpendicular to the ribs 2002 and 2003 disposed respectively on the substrate 2000 and the face plate 1003.

(9) Thereafter, the inside of the prepared glass enclosure assembly (comprising the substrate 2000, the enclosure 1002 and the face plate 1003) was evacuated by means of a vacuum pump through an exhaust pipe (not shown) to achieve a satisfactory degree of vacuum, or approximately $10^{-6}$ Torr, and then the enclosure assembly was hermetically sealed by melting the exhaust pipe (not shown) by means of a gas burner.

(10) Finally, the enclosure assembly was subjected to a getter process in order to maintain the inside to a satisfactory level of vacuum. This is a process where a getter (not shown) that has been arranged in advance at a given position within the enclosure assembly of an image-forming apparatus is heated typically by means of a resistance heater or a high frequency induction heater to produce a film of the material of the getter by deposition. A getter typically contains barium as a principal ingredient and the deposited film of the getter can maintain the inside of a hermetically sealed vessel to an enhanced degree of vacuum through its adsorption effect.

While the process of preparing an image-forming apparatus according to the invention is described above by referring to an experiment where an image-forming apparatus was produced according to the eleventh embodiment of the invention, it may be understood that many modifications may be made thereto according to the application of the image-forming apparatus to be produced particularly in terms of the materials involved and the design details of the apparatus.

Figure 24:
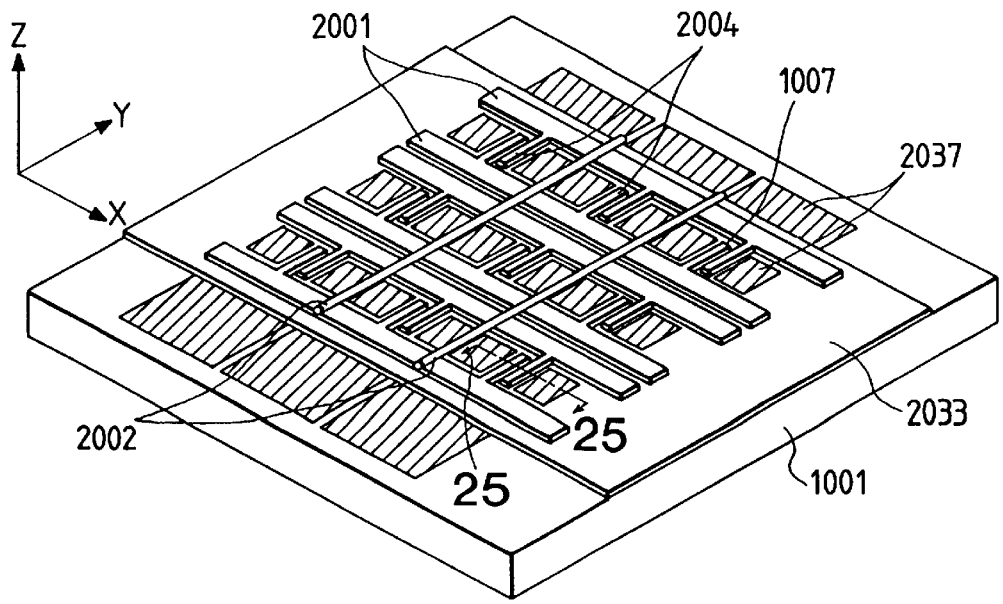
FIG. 24 is a schematic perspective view of an image-forming apparatus obtained by modifying the eleventh embodiment of FIG. 13, showing the electron source substrate in greater detail.
Figure 25:
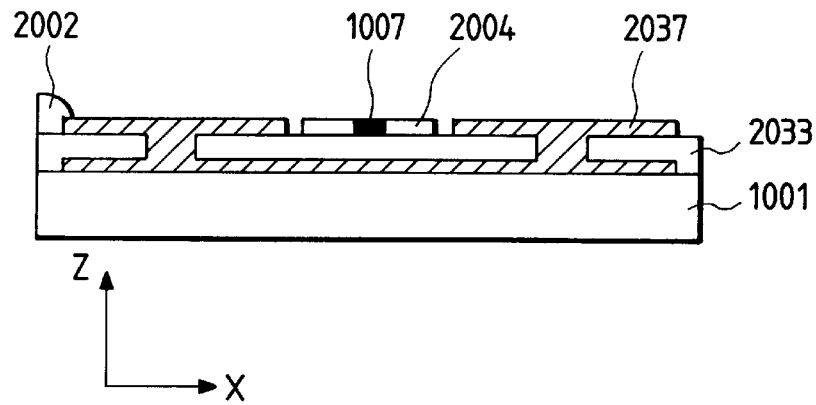
FIG. 25 is a sectional side view of the apparatus of FIG. 24 taken along the B—B' line.

FIGS. 24 and 25 show an image-forming apparatus obtained by modifying the above described eleventh embodiment, where a number of grid electrodes are arranged for modulation on the same glass substrate where the electron-emitting devices are arranged. FIG. 24 is a schematic perspective view of the modified embodiment and FIG. 25 is a sectional side view of the modified embodiment taken along 25—25 line. Note that the components that are same as those of the embodiment of FIG. 13 are denoted by the same respective reference symbols. Referring to FIGS. 24 and 25, the embodiment comprises a glass substrate 1001, a number of electron-emitting regions 1007, wires 2001 and device electrodes 2004, a number of modulation grid electrodes 2037 and an insulator film 2033 for electrically insulating the electron-emitting devices (including electron-emitting regions 1007) from the modulation grid electrodes 2037. Reference numeral 2002 collectively denotes ribs same as those of the above embodiment. As seen from FIGS. 24 and 25, the modulation grid electrodes 2037 are arranged on a plane where the electron-emitting regions 1007, the device electrodes 2004 and the wires 2001 are disposed and under the device electrodes 2004.

Since this modified embodiment can be produced by means of a process involving vapor deposition and etching as in the case of the original embodiment, it will not be described here any further.

With this embodiment, the rate at which the fluorescent members are irradiated with electron beams can be controlled by regulating the voltage applied to the modulation grid electrodes 2037.

As described above, in the above described embodiment of image-forming apparatus, anti-atmospheric-pressure spacers can be arranged easily and appropriately between the face plate and the device substrate without damaging the fluorescent layer and the device electrode for electron-emitting devices so that the entire apparatus can be assembled without difficulty. Additionally, the embodiment is not accompanied by any displacement of spacers that can reduce the quality of the image displayed on the screen of the apparatus even if the apparatus is subjected to strain and stress.

[Embodiment 12]

Figure 16:
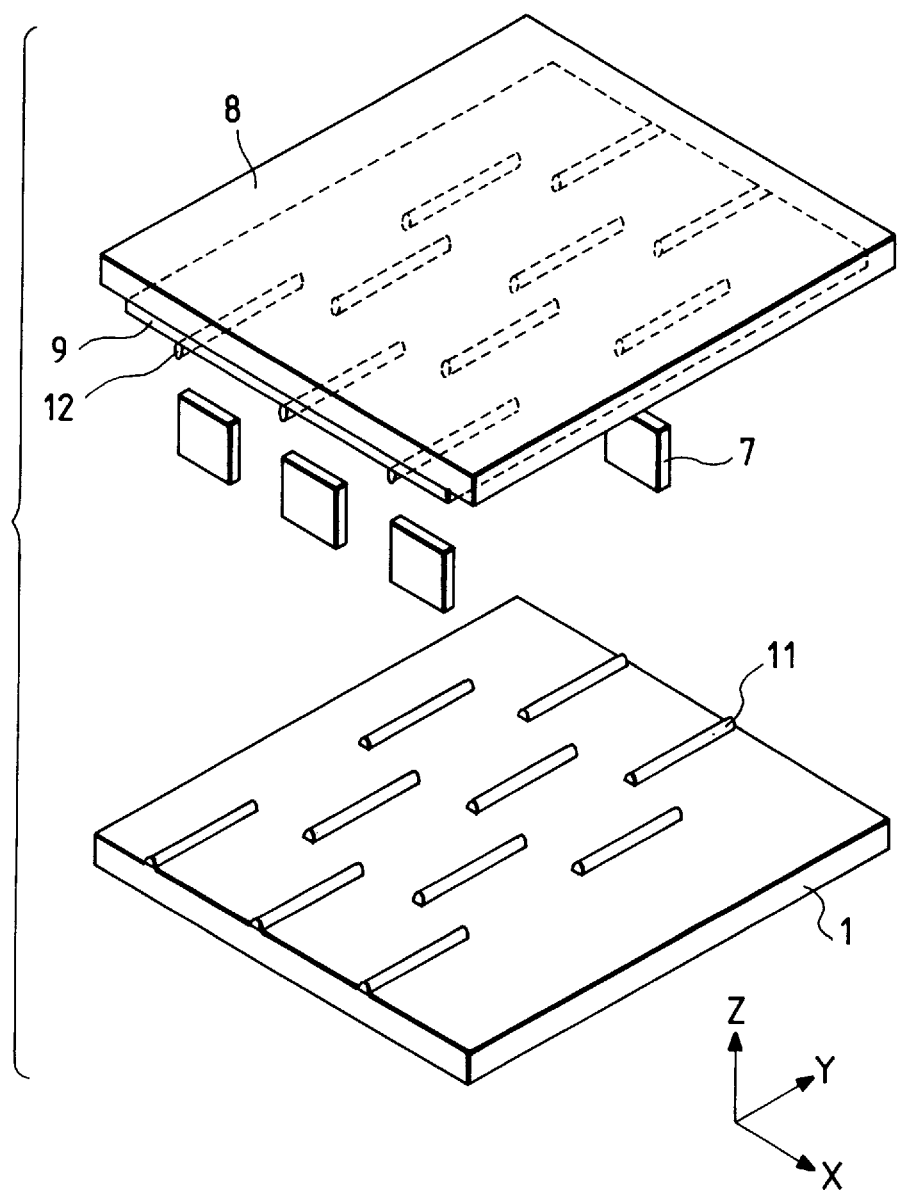
FIG. 16 is an exploded schematic perspective view of a twelfth embodiment of the invention, showing its principal components and their arrangement.

FIG. 16 shows an exploded schematic perspective view of a twelfth embodiment of the invention.

Since the techniques involved in forming electron-emitting devices on a substrate 2000, a fluorescent layer 2009 and the entire apparatus for this embodiment are same as those used for the above described first embodiment, any further description of the techniques will be omitted here. Moreover, since the side walls and the grid electrodes of this embodiment are same as their counterparts of the first embodiment, they are not shown in FIG. 16.

Unlike the first embodiment, however, the device-side ribs 2002, the fluorescent-layer-side ribs 2003 and the anti-atmospheric-pressure spacers 1004 of this embodiment are arranged not linearly and continuously but intermittently.

Nevertheless, since ribs made of frit glass having a height and a width of approximately 100 μm are formed on the fluorescent layer 2009 and the substrate 2000 at locations corresponding to those of the spacers 1004 by means of printing so that the spacers 1004 may never come in touch with the fluorescent layer nor any of the electrodes (not shown) of electron-emitting devices, the spacers operate as effective as those of the first embodiment.

Additionally, since the spacers 1004 of this embodiment are shorter than those of the above described eleventh embodiment, they are less liable to be deformed in the process of preparing them and can be produced with a higher level of precision. Finally, since there exists practically nothing that interferes with the conductance in the embodiment, the time required for hermetically sealing the evacuated (to a degree of vacuum of approximately $10^{-6}$ Torr) embodiment can be remarkably reduced.

[Embodiment 13]

Figure 18:
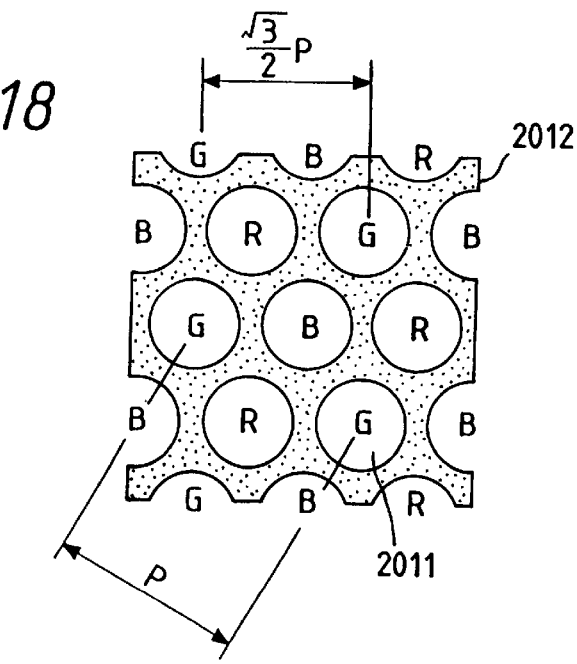
FIG. 18 is an enlarged schematic partial plan view of the fluorescent layer of the embodiment of FIG. 17.

FIG. 18 shows an enlarged schematic partial plan view of the fluorescent layer of a thirteenth embodiment of image-forming apparatus according to the invention.

As seen from FIG. 18, the fluorescent members 2011 of this embodiment are arranged to show a so-called delta array. In FIG. 18, reference numeral 2012 denotes a black layer in which fluorescent members are arranged to show a matrix. If the distance separating any two most closely arranged fluorescent members of a same color (or dot pitch) is P in a delta array of fluorescent members, the horizontal distance of the two same color members is $(\sqrt{3})P/2$, signifying that the entire display screen shows an improved resolution horizontally and is capable of displaying clear images.

Figure 17:
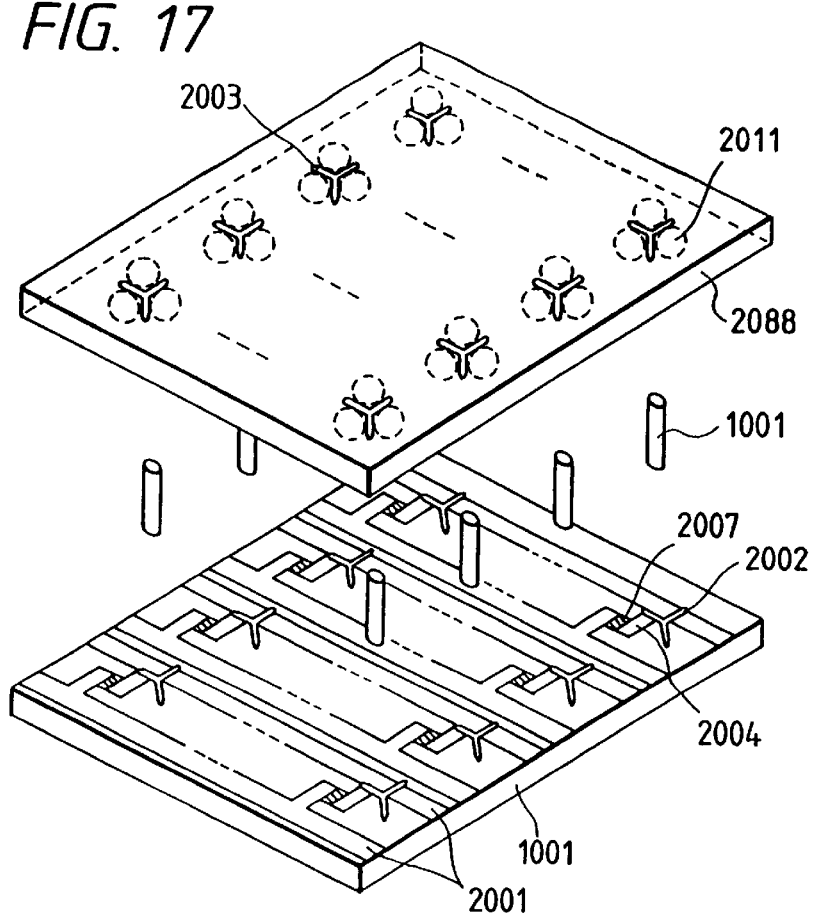
FIG. 17 is an exploded schematic perspective view of a thirteenth embodiment of the invention, showing its principal components and their arrangement.

FIG. 17 is an exploded schematic perspective view of the thirteenth embodiment comprising a delta array of fluorescent members, showing its principal components and their arrangement. As seen in FIG. 17, both the device-side ribs 2002 and the fluorescent-layer-side ribs 2003 are realized in the form of a three-fingered starfish and arranged such that the ribs 2002 and 2003 are held in contact with respective cylindrical anti-atmospheric-pressure spacers 1004. With such an arrangement, the fluorescent layer 2009 and the device electrodes 2001 and 2004 are least liable to be damaged and, consequently, the embodiment can stably display clear images for a prolonged service life.

When any of the above described embodiments is used as a light source of an image recording apparatus, the latter operates stably to reproduce clear and flawless images.

[Embodiment 14]

Figure 19:
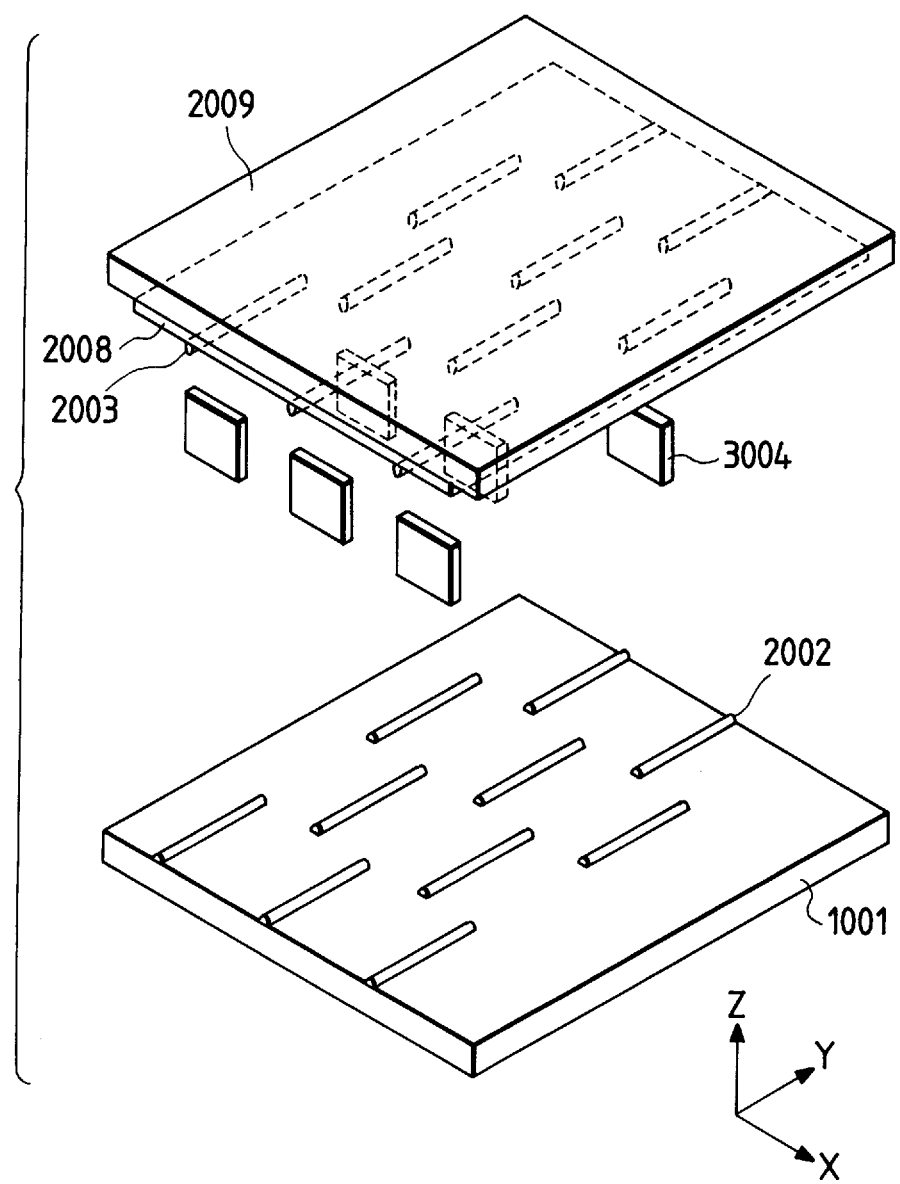
FIG. 19 is an exploded schematic perspective view of a fourteenth embodiment of the invention, showing its principal components and their arrangement.
Figure 20:
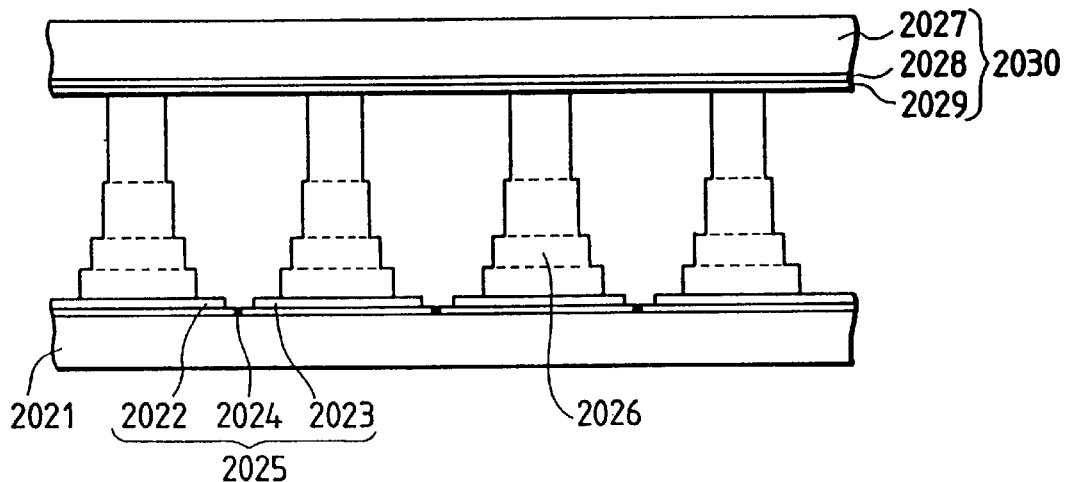
FIG. 20 is a schematic partial sectional side view of a conventional flat type image-forming apparatus.
Figure 21:
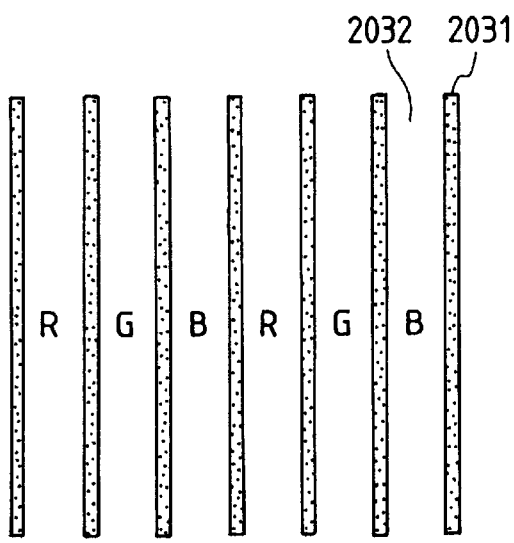
FIG. 21 is an enlarged schematic partial plan view of the fluorescent layer of a conventional flat type image-forming apparatus.
Figure 22:
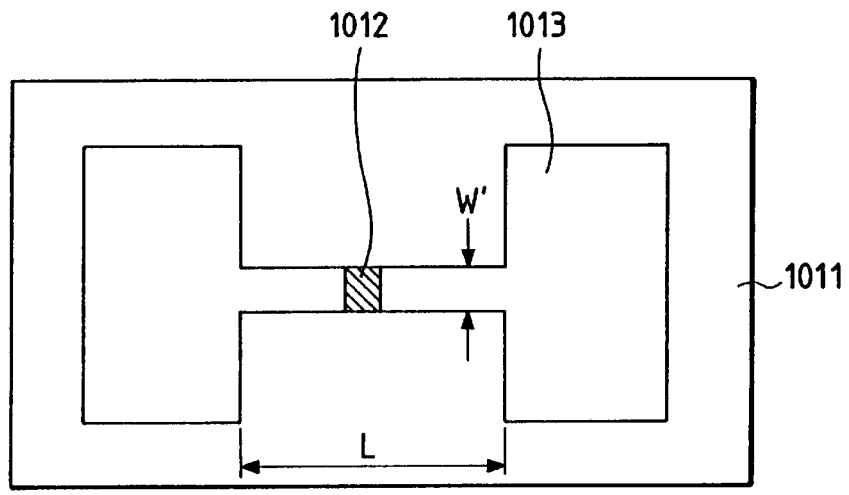
FIG. 22 is a schematic plan view of a typical surface conduction electron-emitting device.

FIG. 19 is an exploded schematic perspective view of a fourteenth embodiment of the invention, showing its principal components and their arrangement. Note that the back plate is directionally arranged in FIG. 19 same as that of FIG. 1B.

A back plate carrying thereon a number of electron-emitting devices and wires arranged in the form of a matrix on an X-Y plane as illustrated in FIG. 1B and used for the first embodiment is also used for this embodiment and, as shown in FIG. 19, device-side ribs 2002 are arranged on the back plate along a direction perpendicular to that of deflection of electron beams emitted from the electron-emitting devices as in the case of the eleventh embodiment. Then, a plurality of small anti-atmospheric-pressure spacers 3004 having a length L' smaller than the length L of the enclosure 1002 along the X-axis are arranged in parallel with the direction of deflection of electron beams emitted from the devices. Additionally, a certain number of small anti-atmospheric-pressure spacers are arranged in a zigzag manner along a direction (Y-direction) perpendicular to the direction of arrangement of the above mentioned small spacers.

Along with these components, a face plate carrying a fluorescent layer and provided with a number of fluorescent-layer-side ribs 2003 as that of the eleventh embodiment illustrated in FIG. 15 is used to form an image-forming apparatus. Any known techniques may be used for the evacuation of the apparatus and the process of utilizing a getter.

Again, since there exists practically nothing that interferes with the conductance in the embodiment when it is evacuated, the time required for hermetically sealing the evacuated (to a degree of vacuum of approximately $10^{-6}$ Torr) embodiment can be remarkably reduced. Additionally, since anti-atmospheric-pressure spacers can be arranged between the face plate and the substrate without damaging the fluorescent layer and the electrode layer for electron-emitting devices, the entire apparatus can be assembled without any problem. Finally, since the arranged anti-atmospheric-pressure spacers are least liable to be unintentionally displaced, the tracks of emitted electron beams are free from interference and, therefore, the apparatus can display clear images for a prolonged service life even if it is occasionally subjected to strain and stress.

[Embodiment 15]

Figure 26:
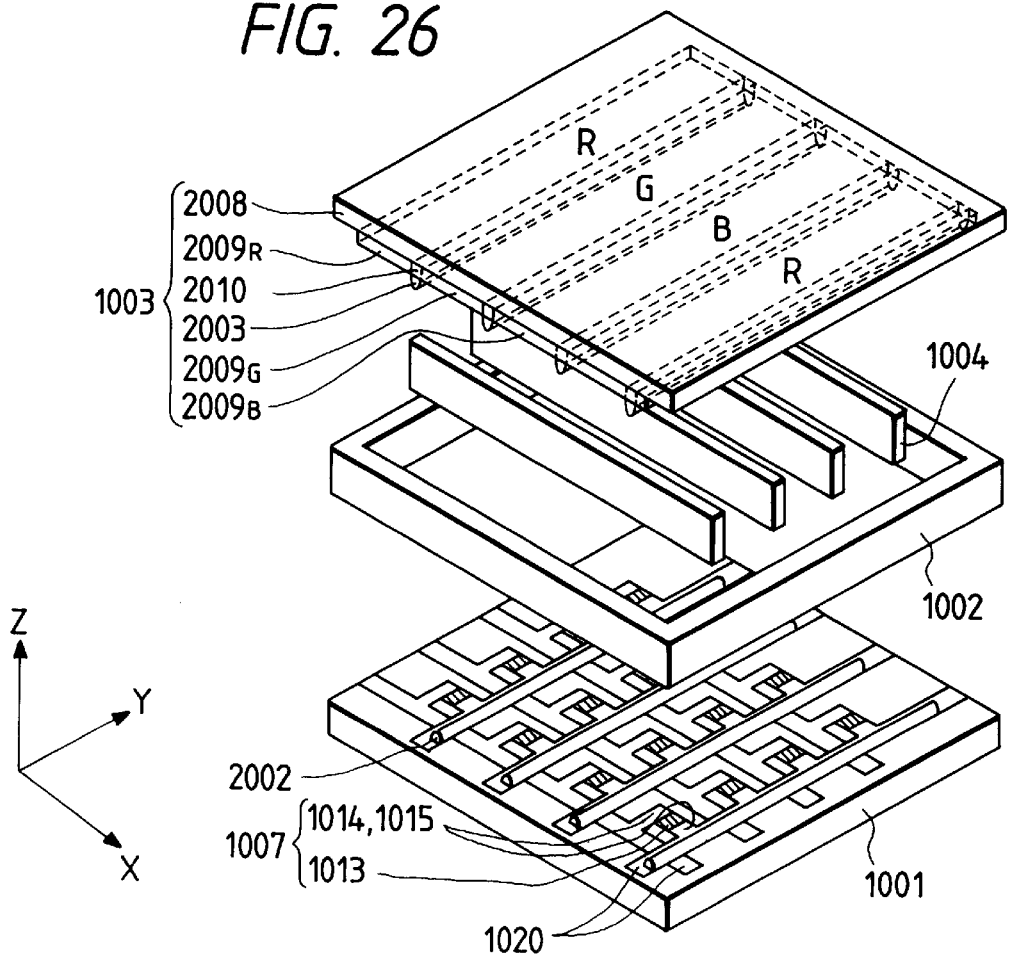
FIG. 26 is a schematic perspective view of another image-forming apparatus obtained by modifying the eleventh embodiment of FIG. 13.

FIG. 26 is a schematic perspective view of a fifteenth embodiment of image-forming apparatus according to the invention. This embodiment is obtained by replacing the back plate of the eleventh embodiment (comprising a glass substrate 1001 and electron-emitting devices formed thereon as illustrated in FIG. 13) with the back plate 1001 of the first embodiment (as illustrated in FIG. 1B). In FIG. 26, the components same as those of the first and eleventh embodiments are denoted by the same reference symbols.

Referring to FIG. 26, the embodiment comprises a glass substrate 1001, an enclosure 1002, a face plate 1003, a number of anti-atmospheric-pressure spacers 1004 arranged substantially in parallel with the X-axis, a number of electron-emitting devices formed on the glass substrate 1001 and arranged to show a matrix and wires for applying the respective electron-emitting devices to cause them to emit electrons.

The electron-emitting devices are surface conduction electron-emitting devices, each comprising a pair of device electrodes 1014 and 1015 and a thin film 1013 including an electron-emitting region formed between the device electrodes. Like the anti-atmospheric-pressure spacers 1004, the pair of device electrodes 1014 and 1015 are arranged substantially in parallel with the X-axis in each of the electron-emitting devices.

A number stripe-shaped oblong red (R) fluorescent members 2009R, green (G) fluorescent members 2009G and blue (B) fluorescent members 2009B are regularly arranged on the face plate 1003 in parallel with one another along the Y-axis to form a fluorescent layer 2009 and any two adjacent fluorescent members are separated by a black stripe 2010. A metal back layer (not shown) is formed on the inner surface of the fluorescent layer 2009.

The embodiment additionally comprises a number of device-side ribs 2002 arranged in parallel with one another along the Y-axis on respective wires 1020 and having a height greater than that of the device electrodes 1014, 1014 and a number of stripe-shaped fluorescent-layer-side ribs 2003 arranged in parallel with one another along the Y-axis on respective black stripes 2010 and having a height greater than that of the fluorescent members 2009. The device-side ribs 2002 and the fluorescent-layer-side ribs 2003 are arranged in contact with a plurality of spacers 1004 arranged along a direction (X-direction) perpendicular to them.

Since the techniques involved in preparing the embodiment of image-forming apparatus are the same as those used for the above described eleventh embodiment (FIG. 13), any further description of the techniques will be omitted here.

Electron beams emitted from the electron-emitting devices 1007 having a configuration as described above come to have a Z-directional velocity component as an accelerating voltage is applied thereto mainly between the glass substrate 1001 and the face plate 1003 and also a +X- or −X-directional velocity component as they are deflected toward the respective device anodes (see FIGS. 23A and 23B). The electron beams eventually collide with the respective fluorescent targets of electron beam irradiation arranged on the inner surface of the face plate and cause the latter to emit light to form images on the display screen of the apparatus. Note that, in this embodiment, the anti-atmospheric-pressure spacers do not interfere with any of the electron beams being accelerated by the accelerating voltage so that the electron beams collide with the respective fluorescent targets as if there were no anti-atmospheric-pressure spacers arranged within the apparatus.

As described above, in the above described embodiment of image-forming apparatus comprising ribs 2002 and 2003, anti-atmospheric-pressure spacers can be arranged easily and appropriately between the face plate and the device substrate without damaging the fluorescent layer and the device electrode for electron-emitting devices so that the entire apparatus can be assembled without difficulty. Additionally, the embodiment is not accompanied by any displacement of spacers that can damage the quality of the image displayed on the screen of the apparatus even if the apparatus is subjected to strain and stress.

Since the stripe-shaped fluorescent members 2009 are arranged along the Y-axis on the face plate 1003 of the embodiment, the glass substrate 1001 carrying thereon the electron-emitting devices does not need to be precisely aligned with the face plate 1003 carrying thereon the fluorescent members 2009 in terms of Y-direction (a direction in parallel with that of the stripe-shaped fluorescent members 2009). In an experiment, no reduction in the brightness of the displayed image nor color breakup in the display screen were observed if the glass substrate 1001 and the face plate 1003 were slightly misaligned in Y-direction. Additionally, the spacers 1004 do not require accurate mutual alignment in X- and Y-directions when they are arranged on the face plate 1003 (in parallel with the X-axis) and it is sufficient for them to be arranged with regular intervals in correspondence with the respective electron-emitting devices.

While the process of preparing the fifteenth embodiment of image-forming apparatus according to the invention is described above, it will be understood that many modifications may be made thereto according to the application of the image-forming apparatus to be produced particularly in terms of the materials involved and the design details of the apparatus.

Figure 27:
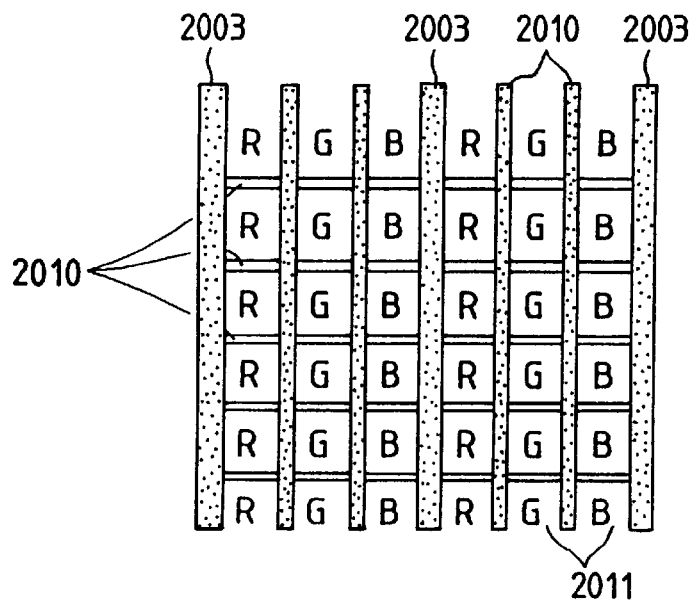
FIG. 27 is an enlarged schematic partial plan view of the fluorescent layer of the image-forming apparatus of FIG. 26.

FIG. 27 shows the arrangement of fluorescent members on the face plate of an image-forming apparatus obtained by modifying the above described fifteenth embodiment. This modified embodiment differs from the embodiment of FIG. 26 in that each of the stripe-shaped oblong fluorescent members is divided into a number of sections such that the sections correspond to respective pixels. A black shade member may be arranged on the boundary 2010 of any two adjacent sections.

In this modified embodiment again, the glass substrate 1001 carrying thereon the electron-emitting devices does not need to be precisely aligned with the face plate 1003 carrying thereon the fluorescent members 2009 in terms of Y-direction (a direction in parallel with that of the stripe-shaped fluorescent members 2009). In an experiment, no reduction in the brightness of the displayed image nor color breakup in the display screen were observed if the glass substrate 1001 and the face plate 1003 were slightly misaligned in Y-direction. Additionally, the spacers 1004 do not require accurate mutual alignment in X- and Y-directions when they are arranged on the face plate 1003 (in parallel with the X-axis) and it is sufficient for them to be arranged with regular intervals in correspondence with the respective electron-emitting devices.

The above embodiment may be modified in many different ways. For example, a device-side rib 2002 may be provided for every several electron-emitting devices or a fluorescent-layer-side rib may be provided for every three stripe-shaped fluorescent members for red, green and blue.

[Advantages of the Invention]

As described above in detail, in an image-forming apparatus according to the invention and comprising, in particular, surface conduction electron-emitting devices, there is provided a panel structure where the tracks of electron beams emitted from the electron-emitting devices are made free from obstruction as a result of arranging anti-atmospheric-pressure spacers in parallel with the direction of deflection of electron beams emitted from the electron-emitting devices. Therefore, an image-forming apparatus according to the invention has, above all, the following advantages.

(1) The apparatus is free from any loss in the rate of collision of electrons with the fluorescent layer and, therefore, the fluorescent layer can stably and efficiently emit light for image display.

(2) The apparatus is free from any swerved tracks of electrons that can be brought forth by undesired changes in the distribution of electric potential due to charged-up anti-atmospheric-pressure spacers in the apparatus and is also free from any destruction of devices that can be brought forth by creeping discharge due to reduction in the withstand creeping voltage.

(3) The apparatus can have a light emitting section that can emit light efficiently to a high degree of brightness because it can have an enhanced withstand creeping voltage and hence a high accelerating voltage.

(4) The apparatus can display highly defined clear images because electron-emitting devices and anti-atmospheric-pressure spacers can be densely arranged in the apparatus.

(5) The apparatus can be manufactured efficiently because the conductance in the apparatus can be improved by using small anti-atmospheric-pressure spacers.

(6) The apparatus can have an improved capability for maintaining a high degree of vacuum within the apparatus because the entire surface area of the spacers comprised in the apparatus can be reduced by arranging small anti-atmospheric-pressure spacer in a zigzag manner. Additionally, the apparatus has the following advantage when it comprises device-side and fluorescent-layer-side ribs.

(7) The apparatus is free from damage on the devices and the fluorescent members if the anti-atmospheric-pressure spacers are arranged with slight displacement or deformation because the anti-atmospheric-pressure spacers for separating the substrate and the face plate are not held in touch with the electron-emitting devices and the fluorescent members. Hence, the entire apparatus can be assembled with a lesser degree of complexity and display clear images for a prolonged service life.

What is claimed is:

1. An image-forming apparatus, comprising:
    a back plate carrying thereon a plurality of electron-emitting devices each comprising a pair of electrodes disposed on a carrying surface of said back plate and an electron-emitting region disposed between said pair of electrodes;
    a face plate arranged opposite to said back plate and carrying thereon a fluorescent member; and
    a plurality of plate-like anti-atmospheric-pressure spacers disposed inside of the apparatus, each said spacer having main surfaces in a longitudinal direction thereof, wherein
    said plate-like anti-atmospheric-pressure spacers are arranged so that all of said main surfaces are substantially in parallel with a direction in which said pair of electrodes are disposed.

2. An image-forming apparatus according to claim 1, wherein said plurality of anti-atmospheric-pressure spacers are arranged in rows substantially perpendicular to the direction in which said pair of electrodes are disposed.

3. An image-forming apparatus according to claim 2, wherein each of said anti-atmospheric-pressure spacers comprises a plurality of small spacers.

4. An image-forming apparatus according to claim 3, wherein said plurality of small spacers are arranged zigzag or in a staggered manner relative to the direction in which said pair of electrodes are disposed.

5. An image-forming apparatus according to any of claims 1 through 4, wherein said electron-emitting devices are cold cothode electron-emitting devices.

6. An image-forming apparatus according to any of claims 1 through 4, wherein said electron-emitting devices are surface conduction electron-emitting devices.

7. An image-forming apparatus according to claim 1, wherein said fluorescent member of said face plate is divided into a plurality of sections by partitions arranged substantially in perpendicular to the direction in which said pair of electrodes are disposed.

8. An image-forming apparatus, comprising:

a back plate carrying thereon a plurality of electron-emitting devices each comprising a pair of electrodes disposed on a carrying surface of said back plate and an electron-emitting region disposed between said pair of electrodes;

a face plate arranged opposite to said back plate and carrying thereon a fluorescent member; and a plurality of plate-like anti-atmospheric-pressure spacers disposed inside of the apparatus, each said spacer having main surfaces in a longitudinal direction thereof, wherein said plate-like anti-atmospheric-pressure spacers are arranged so that all of said main surfaces are substantially in parallel with a direction in which said pair of electrodes are disposed and in that a device-side rib is arranged on said back plate, projecting from said back plate higher than any of said electrodes of said electron-emitting devices, and a fluorescent-layer-side rib is arranged on said face plate, projecting from said face plate higher than said fluorescent layer, said anti-atmospheric-pressure spacers being held in contact with said back plate and said face plate respectively by way of said device-side rib and said fluorescent-layer-side rib.

9. An image-forming apparatus according to claim 8, wherein said plurality of anti-atmospheric-pressure spacers are arranged in rows substantially perpendicular to the direction in which said pair of electrodes are disposed.

10. An image-forming apparatus according to claim 9, wherein each of said anti-atmospheric-pressure spacers comprises a plurality of small spacers.

11. An image-forming apparatus according to claim 10, wherein said plurality of small spacers are arranged zigzag or in a staggered manner relative to the direction in which said pair of electrodes are disposed.

12. An image-forming apparatus according to claim 8, wherein said fluorescent-layer-side rib is black.

13. An image-forming apparatus according to any of claims 8 through 12, wherein said electron-emitting devices are cold cathode electron-emitting devices.

14. An image-forming apparatus according to any of claims 8 through 12, wherein said electron-emitting devices are surface conduction electron-emitting devices.

15. An image-forming apparatus according to claim 8, wherein said fluorescent member of said face plate is divided into a plurality of sections by partitions arranged substantially in perpendicular to the direction in which the pair of electrodes are disposed.

* * * * *

UNITED STATES PATENT AND TRADEMARK OFFICE
CERTIFICATE OF CORRECTION

PATENT NO. : 5,821,689

DATED : October 13, 1998

INVENTOR(S) : TOMOKAZU ANDOH, ET AL.

Page 1 of 2

It is certified that error appears in the above-identified patent and that said Letters Patent is hereby corrected as shown below:

ON THE COVER SHEET:

At Item [56] Under FOREIGN PATENT DOCUMENTS:

"1257552" should read --1-257552--;
"1283749" should read --1-283749--; and
"2299136" should read --2-299136--.

COLUMN 4:

Line 1, "of-electron" should read --of electron--.

COLUMN 6:

Line 36, "hundred" should read --hundreds--.

UNITED STATES PATENT AND TRADEMARK OFFICE
CERTIFICATE OF CORRECTION

PATENT NO. : 5,821,689

DATED : October 13, 1998

INVENTOR(S): TOMOKAZU ANDOH, ET AL.

It is certified that error appears in the above-identified patent and that said Letters Patent is hereby corrected as shown below:

COLUMN 9:

Line 1, "angstroms" should read --of angstroms--; and
Line 32, "it comprises" should read --they comprise--.

COLUMN 13:

Line 63, "al" should read --al--.

COLUMN 14:

Line 14, "al" should read --al--.

COLUMN 20:

Line 20, "1014, 1014" should read --1014, 1015--.

COLUMN 22:

Line 17, "spacer" should read --spacers--.

Signed and Sealed this

Seventeenth Day of August, 1999

Attest:

Q. TODD DICKINSON

*Attesting Officer*  *Acting Commissioner of Patents and Trademarks*